US012624224B2

(12) United States Patent
Brown-Tseng et al.

(10) Patent No.: US 12,624,224 B2

(45) Date of Patent: May 12, 2026

(54) SYSTEMS FOR TREATING A METAL SUBSTRATE

(71) Applicant: PPG Industries Ohio, Inc., Cleveland, OH (US)

(72) Inventors: Elizabeth S. Brown-Tseng, Gibsonia, PA (US); Joseph P. Kriley, Valencia, PA (US); Marvin M. Pollum, Jr., Pittsburgh, PA (US); Masayuki Nakajima, Wexford, PA (US); Ljiljana Maksimovic, Allison Park, PA (US); Brian K. Rearick, Allison Park, PA (US); Adam B. Powell, Wexford, PA (US); David J. Fortman, Pittsburgh, PA (US); Loubna Pagnotti, Wexford, PA (US); Visham Appadoo, Cranberry Township, PA (US); Edward R. Millero, Jr., Gibsonia, PA (US); Se Reyon Lee, Pittsburgh, PA (US); Steven J. Lemon, Lower Burrell, PA (US); Steven E. Bowles, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 983 days.

(21) Appl. No.: 17/429,439

(22) PCT Filed: Feb. 11, 2020

(86) PCT No.: PCT/US2020/017647

§ 371 (c)(1), (2) Date: Aug. 9, 2021

(87) PCT Pub. No.: WO2020/167758

PCT Pub. Date: Aug. 20, 2020

(65) Prior Publication Data

US 2022/0127466 A1 Apr. 28, 2022

Related U.S. Application Data

(60) Provisional application No. 62/803,810, filed on Feb. 11, 2019, provisional application No. 62/890,703, filed on Aug. 23, 2019.

(51) Int. Cl.

| | |
|---|---|
| ***C09J 5/02*** | (2006.01) |
| ***B32B 27/38*** | (2006.01) |
| ***C09D 5/08*** | (2006.01) |
| ***C09D 143/00*** | (2006.01) |
| ***C09J 163/00*** | (2006.01) |

(52) U.S. Cl.

CPC ............. *C09D 5/08* (2013.01); *C09D 143/00* (2013.01); *C09J 163/00* (2013.01); *C11D 2111/16* (2024.01)

(58) Field of Classification Search

None

See application file for complete search history.

(56) References Cited

U.S. PATENT DOCUMENTS

| | | | | | |
|---|---|---|---|---|---|
| 3,138,485 | A | * | 6/1964 | Kaveggia | C23G 1/125 216/101 |
| 3,468,779 | A | * | 9/1969 | Thow | C08J 3/05 428/457 |
| 3,761,371 | A | * | 9/1973 | Dickie | C09D 5/448 524/517 |
| 4,124,407 | A | * | 11/1978 | Binns | C23G 1/125 134/40 |
| 4,366,307 | A | | 12/1982 | Singh et al. | |
| 4,609,762 | A | | 9/1986 | Morris et al. | |
| 4,793,867 | A | | 12/1988 | Charles et al. | |
| 4,980,234 | A | * | 12/1990 | Almer | C08G 59/066 525/122 |
| 5,103,550 | A | | 4/1992 | Wefers et al. | |
| 5,225,472 | A | | 7/1993 | Cameron et al. | |
| 5,588,989 | A | | 12/1996 | Vonk et al. | |
| 6,172,179 | B1 | | 1/2001 | Zook et al. | |
| 6,797,387 | B2 | | 9/2004 | Ambrose et al. | |
| 7,432,333 | B2 | | 10/2008 | Duffy et al. | |
| 7,470,752 | B2 | | 12/2008 | Duffy et al. | |

(Continued)

FOREIGN PATENT DOCUMENTS

| | | | |
|---|---|---|---|
| EP | 1504139 | A2 | 2/2005 |
| EP | 1571237 | A1 | 9/2005 |

(Continued)

OTHER PUBLICATIONS

Machine translation of JP-2002294141-A (no date).*

(Continued)

*Primary Examiner* — Michael J Feely

(57) ABSTRACT

Disclosed herein are systems for treating a substrate. The system may include a cleaner composition, a deoxidizing composition comprising a Group IVA metal and/or a Group IVB metal and free fluoride and having a pH of 1.0 to 3.0, and/or a seal composition. The system may also include a coating composition. The cleaner composition, deoxidizing composition, and/or seal composition may comprise a homopolymer or a copolymer comprising a phosphorous-containing monomeric subunit m1. Also disclosed is a deoxidizing composition comprising a Group IVA metal and a Group IVB metal and free fluoride and having a pH of 1.0 to 3.0. Also disclosed are methods of treating a substrate. Also disclosed are treated substrates.

20 Claims, No Drawings

(56) References Cited

U.S. PATENT DOCUMENTS

| | | | | |
|---|---|---|---|---|
| 7,601,425 | B2 | 10/2009 | Stoffer et al. | |
| 7,749,368 | B2 | 7/2010 | McMurdie et al. | |
| 7,759,419 | B2 | 7/2010 | Stoffer et al. | |
| 8,673,091 | B2 | 3/2014 | McMillen et al. | |
| 8,747,605 | B2 | 6/2014 | Lutz et al. | |
| 8,796,361 | B2 | 8/2014 | Asay et al. | |
| 9,181,628 | B2 | 11/2015 | Valko et al. | |
| 2006/0185769 | A1* | 8/2006 | Nakayama | C23C 22/44 148/247 |
| 2007/0095435 | A1* | 5/2007 | Lammerschop | C23C 22/34 148/250 |
| 2007/0272900 | A1* | 11/2007 | Yoshida | C23C 22/53 252/387 |
| 2008/0230394 | A1* | 9/2008 | Inbe | C25D 3/56 205/241 |
| 2008/0230395 | A1 | 9/2008 | Inbe et al. | |
| 2009/0045071 | A1 | 2/2009 | Valko et al. | |
| 2014/0113983 | A1 | 4/2014 | Czaplicki et al. | |
| 2016/0090486 | A1* | 3/2016 | Kinlen | C09D 5/082 428/323 |
| 2018/0029331 | A1* | 2/2018 | Bortell | B23K 11/185 |
| 2018/0044796 | A1 | 2/2018 | Lemon et al. | |
| 2022/0275240 | A1* | 9/2022 | Fortman | C23G 1/125 |
| 2022/0282115 | A1* | 9/2022 | Kriley | C09J 5/02 |

FOREIGN PATENT DOCUMENTS

| | | | | |
|---|---|---|---|---|
| JP | H06299133 | A | | 10/1994 |
| JP | 2002294141 | A | * | 10/2002 |
| JP | 2008221667 | A | * | 9/2008 |
| KR | 20170033942 | A | | 3/2017 |
| WO | 2008016889 | A1 | | 2/2008 |
| WO | 2018031992 | A1 | | 2/2018 |
| WO | 2019164568 | A1 | | 8/2019 |

OTHER PUBLICATIONS

Machine translation of JP-2008221667-A (no date).*

Safety Data Sheet, issued May 19, 2016 by Henkel Canada Corporation for product Loctite EA E-60HP B Hardener known as DB Epoxy ADH E-60HP 50 ML Hard. 10 pages total. English and French.

Safety Data Sheet, issued Aug. 21, 2014 by Henkel Corporation, for product Loctite EA E-60HP A Resin known as DB Epoxy ADH E-60HP 50 ML Resin.

* cited by examiner

SYSTEMS FOR TREATING A METAL SUBSTRATE

CROSS-REFERENCE

This application claims the benefit of U.S. Provisional Patent Application Ser. No. 62/803,810, filed on Feb. 11, 2019, and U.S. Provisional Patent Application Ser. No. 62/890,703, filed on Aug. 23, 2019, which are incorporated herein by reference.

FIELD OF THE INVENTION

The present invention relates to compositions, systems and methods for treating a metal substrate.

BACKGROUND OF THE INVENTION

The use of protective coatings on metal substrates for improved corrosion resistance and paint adhesion is common. Coating compositions, including sealants and adhesives, are utilized in a wide variety of applications to treat a variety of substrates or to bond together two or more substrate materials.

SUMMARY OF THE INVENTION

Disclosed is a system for treating a substrate, comprising: a cleaner composition; and/or a deoxidizing composition comprising a Group IVA metal and/or a Group IVB metal and free fluoride and having a pH of 1.0 to 3.0; and/or a seal composition; and a coating composition.

Also disclosed is a method for treating a substrate, comprising contacting at least a portion of a surface of the substrate with a cleaner composition; and/or contacting at least a portion of the surface with a deoxidizing composition comprising a Group IVA metal and/or a Group IVB metal and free fluoride and having a pH of 1.0 to 3.0; and/or contacting at least a portion of the surface with a seal composition; and contacting at least a portion of the surface with a coating composition.

Also disclosed is a deoxidizing composition comprising: a Group IVA metal; a Group IVB metal; and free fluoride; and having a pH of 1.0 to 3.0.

Also disclosed are substrates treated with the systems.

Also disclosed are substrates treated with the methods.

Also disclosed are substrates treated with the deoxidizing composition.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" epoxy and "an" accelerator, a combination (i.e., a plurality) of these components can be used.

In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "salt" refers to an ionic compound made up of cations and anions and having an overall electrical charge of zero. Salts may be hydrated or anhydrous.

As used herein, "composition" refers to a solution, mixture, or dispersion in a medium.

As used herein, "aqueous composition" refers to a solution, mixture, or dispersion in a medium that comprises predominantly water. For example, the aqueous medium may comprise water in an amount of more than 50 wt. %, or more than 70 wt. % or more than 80 wt. % or more than 90 wt. % or more than 95 wt. % based on the total weight of the medium. That is, the aqueous medium may for example consist substantially of water.

As used herein, the term "dispersion" refers to a two-phase transparent, translucent or opaque system in which particles are in the dispersed phase and an aqueous medium, which includes water, is in the continuous phase.

As used herein, "deoxidizing composition" refers to a composition having a pH of no greater than 3.0 and a free fluoride content of no greater than 50 ppm based on total weight of the deoxidizing composition and that is capable of etching and/or reacting with and chemically altering a substrate surface.

As used herein, "deoxidizing composition bath" or "deoxidizing bath" refers to an aqueous bath containing a deoxidizing composition and that may contain components that are byproducts of the process.

As used herein, "cleaner composition" refers to a composition that removes oil, soil, and other contaminants from a substrate surface and that optionally is capable of etching or oxidizing the substrate surface.

As used herein, "cleaner composition bath" refers to an aqueous bath containing a cleaner composition and that may contain components that are byproducts of the process.

As used herein, "pretreatment composition" refers to a composition that is capable of reacting with and chemically altering the substrate surface and binding to it to form a film that affords corrosion protection.

As used herein, "pretreatment bath" refers to an aqueous bath containing a conversion composition and that may contain components that are byproducts of the process.

As used herein, "seal composition" refers to a composition that affects a substrate surface or a material deposited onto a substrate surface in such a way as to alter the physical and/or chemical properties of the substrate surface, e.g., the composition affords corrosion protection.

As used herein, "seal composition bath" or "seal bath" refers to an aqueous bath containing a seal composition and that may contain components that are byproducts of the process.

As used herein, the terms "Group IA metal" and "Group IA element" refer to an element that is in Group IA of the CAS version of the Periodic Table of the Elements as is shown, for example, in the Handbook of Chemistry and Physics, $63^{rd}$ edition (1983), corresponding to Group 1 in the actual IUPAC numbering.

As used herein, the term "Group IA metal compound" refers to compounds that include at least one element that is in Group IA of the CAS version of the Periodic Table of the Elements.

As used herein, the terms "Group IIIB metal" and "Group IIIB element" refer to an element that is in Group IIIB of the CAS version of the Periodic Table of the Elements as is shown, for example, in the Handbook of Chemistry and Physics, $63^{rd}$ edition (1983), corresponding to Group 3 in the actual IUPAC numbering.

As used herein, the term "Group IIIB metal compound" refers to compounds that include at least one element that is in Group IIIB of the CAS version of the Periodic Table of the Elements.

As used herein, the terms "Group IVA metal" and "Group IVA element" refer to an element that is in group IVA of the CAS version of the Periodic Table of the Elements as is shown, for example, in the Handbook of Chemistry and Physics, $63^{rd}$ edition (1983), corresponding to Group 14 in the actual IUPAC numbering.

As used herein, the terms "Group IVA metal compound" refer to compounds that include at least one element that is in Group IVA of the CAS version of the Periodic Table of the Elements.

As used herein, the terms "Group IVB metal" and "Group IVB element" refer to an element that is in group IVB of the CAS version of the Periodic Table of the Elements as is shown, for example, in the Handbook of Chemistry and Physics, $63^{rd}$ edition (1983), corresponding to Group 4 in the actual IUPAC numbering.

As used herein, the term "Group IVB metal compound" refers to compounds that include at least one element that is in Group IVB of the CAS version of the Periodic Table of the Elements.

As used herein, the terms "Group VB metal" and "Group VB element" refer to an element that is in group VB of the CAS version of the Periodic Table of the Elements as is shown, for example, in the Handbook of Chemistry and Physics, $63^{rd}$ edition (1983), corresponding to Group 5 in the actual IUPAC numbering.

As used herein, the term "Group VB metal compound" refers to compounds that include at least one element that is in Group VB of the CAS version of the Periodic Table of the Elements.

As used herein, the terms "Group VIB metal" and "Group VIB element" refer to an element that is in group VIB of the CAS version of the Periodic Table of the Elements as is shown, for example, in the Handbook of Chemistry and Physics, $63^{rd}$ edition (1983), corresponding to Group 6 in the actual IUPAC numbering.

As used herein, the term "Group VIB metal compound" refers to compounds that include at least one element that is in Group VIB of the CAS version of the Periodic Table of the Elements.

As used herein, the terms "Group VIIB metal" and "Group VIIB element" refer to an element that is in group VIIB of the CAS version of the Periodic Table of the Elements as is shown, for example, in the Handbook of Chemistry and Physics, $63^{rd}$ edition (1983), corresponding to Group 7 in the actual IUPAC numbering.

As used herein, the term "Group VIIB metal compound" refers to compounds that include at least one element that is in Group VIIB of the CAS version of the Periodic Table of the Elements.

As used herein, the terms "Group JIB metal" and "Group JIB element" refer to an element that is in group XIIB of the CAS version of the Periodic Table of the Elements as is shown, for example, in the Handbook of Chemistry and Physics, $63^{rd}$ edition (1983), corresponding to Group 12 in the actual IUPAC numbering.

As used herein, the term "Group JIB metal compound" refers to compounds that include at least one element that is in Group JIB of the CAS version of the Periodic Table of the Elements.

As used herein, a "coating composition" refers to a composition that, in an at least partially dried or cured state, is capable of producing a film, layer, or the like on at least a portion of a substrate surface.

As used herein, an "adhesive composition" refers to a coating composition that, in an at least partially dried or cured state, produces two adherents having a lap shear strength of greater than 0 MPa as determined according to ASTM D1002-10 using an Instron 5567 machine in tensile mode with a pull rate of 1 mm per minute.

As used herein, the term "structural adhesive composition" refers to an adhesive composition that, in an at least partially dried or cured state, produces a load-bearing joint having both a lap shear strength of at least 10 MPa measured according to ASTM D1002-10 using 2024-T3 aluminum substrate of 1.6 mm thickness, as measured by an INSTRON 5567 machine in tensile mode with a pull rate of 1.3 mm per minute.

As defined herein, a "1K" or "one-component" coating composition, is a composition in which all of the ingredients may be premixed and stored and wherein the reactive components do not readily react at ambient or slightly thermal conditions, but instead only react upon activation by an external energy source. In the absence of activation from the external energy source, the composition will remain largely unreacted (maintaining sufficient workability in the uncured state and greater than 70% of the initial lap shear strength of the composition in the cured state after storage at 25° C. for 8 months). External energy sources that may be used to promote the curing reaction (i.e., the crosslinking of the epoxy component and the curing agent) include, for example, radiation (i.e., actinic radiation) and/or heat.

As used herein, the term "two-component" or "2K" refers to a composition in which at least a portion of the reactive components readily react and at least partially cure without activation from an external energy source, such as at ambient or slightly thermal conditions, when mixed. One of skill in the art understands that the two components of the composition are stored separately from each other and mixed just prior to application of the composition.

As further defined herein, ambient conditions generally refer to room temperature and humidity conditions or temperature and humidity conditions that are typically found in the area in which the composition is applied to a substrate, e.g., at 10° C. to 40° C. and 5% to 80% relative humidity, such as at 20° C. to 40° C. and 20% to 80% relative humidity, while slightly thermal conditions are temperatures that are slightly above ambient temperature but are generally below the curing temperature for the composition (i.e., in other words, at temperatures and humidity conditions below which the reactive components will readily react and cure, e.g., greater than 40° C. and less than 205° C. at 5% to 80% relative humidity, such as less than 50° C. at 5% to 80% relative humidity).

As used herein, "Mw" refers to the weight average molecular weight and means the theoretical value as determined by Gel Permeation Chromatography using Waters 2695 separation module with a Waters 410 differential refractometer (RI detector) and polystyrene standards, tetrahydrofuran (THF) used as the eluent at a flow rate of 1 ml $min^{-1}$, and two PL Gel Mixed C columns used for separation.

As used herein, the term "accelerator" means a substance that increases the rate or decreases the activation energy of a chemical reaction. An accelerator may be either a "catalyst," that is, without itself undergoing any permanent chemical change, or may be reactive, that is, capable of chemical reactions and includes any level of reaction from partial to complete reaction of a reactant.

As used herein, the term "cure" or "curing", means that the components that form the composition are crosslinked to form a film, layer, or bond. As used herein, the term "at least partially cured" means that at least a portion of the components that form the composition interact, react, and/or are crosslinked to form a film, layer, or bond. In the case of a 1K composition, the composition is at least partially cured or cured when the composition is subjected to curing conditions that lead to the reaction of the reactive functional groups of the components of the composition, such as elevated temperature, lowered activation energy through catalytic activity, radiation, etc. In the case of a 2K composition, the composition is at least partially cured or cured when the components of the composition are mixed to lead to the reaction of the reactive functional groups of the components of the composition.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "glass transition temperature" ("Tg") refers to the temperature at which an amorphous material, such as glass or a high polymer, changes from a brittle vitreous state to a plastic or rubbery state or from a plastic or rubbery state to a brittle vitreous state.

Disclosed herein is a deoxidizing composition. The deoxidizing composition may comprise a Group IVA metal and/or a Group IVB metal, and free fluoride. The deoxidizing composition may have a pH of 1.0 to 3.0. The deoxidizing composition may be applied alone or as part of a system described below that can be deposited in a number of different ways onto a number of different substrates.

The Group IVA metal may, for example, comprise silicon such as silanes, silicas, silicates, and the like. The Group IVA metal may be provided in the deoxidizing composition in the form of specific compounds of the metals, such as their soluble acids and/or salts. Examples of useful compounds include fluorosilicic acid, ammonium and alkali metal fluorosilicates, and the like, including by way of non-limiting example, hexafluorosilicate.

The Group IVA metal, if present at all, may be present in the deoxidizing composition in an amount of at least 10 ppm based on total weight of the deoxidizing composition, such as at least 20 ppm, such as at least 50 ppm, and, if present at all, may be present in the deoxidizing composition in an amount of no more than 1000 ppm based on total weight of the deoxidizing composition, such as no more than 500 ppm, such as no more than 250 ppm. The Group IVA metal, if present at all, may be present in the deoxidizing composition in an amount of 10 ppm to 1000 ppm based on total weight of the deoxidizing composition, such as 20 ppm to 500 ppm, such as 50 ppm to 250 ppm.

As stated above, the deoxidizing composition may comprise a Group IVB metal. Optionally, the deoxidizing composition may comprise more than one Group IVB metal. The Group IVB metal may comprise zirconium, titanium, hafnium, or combinations thereof. For example, the Group IVB metal used in the deoxidizing composition may be a compound of zirconium, titanium, hafnium, or a mixture thereof. Suitable compounds of zirconium include, but are not limited to, hexafluorozirconic acid, alkali metal and ammonium salts thereof, ammonium zirconium carbonate, zirconyl nitrate, zirconyl sulfate, zirconium carboxylates and zirconium hydroxy carboxylates, such as zirconium acetate, zirconium oxalate, ammonium zirconium glycolate, ammonium zirconium lactate, ammonium zirconium citrate, zirconium basic carbonate, zirconium tetraklaloids, and mixtures thereof. Suitable compounds of titanium include, but are not limited to, fluorotitanic acid and its salts. A suitable compound of hafnium includes, but is not limited to, hafnium nitrate.

The Group IVB metal, if present at all, may be present in the deoxidizing composition in a total amount of at least 200 ppm based on total weight of the deoxidizing composition, such as at least 250 ppm, such as at least 300 ppm. The Group IVB metal, if present at all, may be present in the deoxidizing composition in a total amount of no more than 5000 ppm based on total weight of the deoxidizing composition, such as no more than 4000 ppm, such as no more than 3500 ppm. The Group IVB metal may be present in the deoxidizing composition in a total amount of 200 ppm to 5000 ppm based on total weight of the deoxidizing composition, such as 250 ppm to 4000 ppm, such as 300 ppm to 3500 ppm.

The deoxidizing composition also may comprise a Group IA metal such as lithium. According to the invention, the source of Group IA metal in the deoxidizing composition may be in the form of a salt. Non-limiting examples of suitable lithium salts include lithium nitrate, lithium sulfate, lithium fluoride, lithium chloride, lithium hydroxide, lithium carbonate, lithium iodide, and combinations thereof.

The Group IA metal may be present in the deoxidizing composition in an amount of at least 2 ppm based on a total weight of the deoxidizing composition, such as at least 5 ppm, such as at least 25 ppm, such as at least 75 ppm, and in some instances, may be present in an amount of no more than 500 ppm based on a total weight of the deoxidizing composition, such as no more than 250 ppm, such as no more than 125 ppm, such as no more than 100 ppm. The Group IA metal may be present in the deoxidizing composition in an amount of 2 ppm to 500 ppm based on a total weight of the deoxidizing composition, such as 5 ppm to 250 ppm, such as 5 ppm to 125 ppm, such as 25 ppm to 125 ppm, such as 75 ppm to 100 ppm, such as 5 ppm to 25 ppm.

The deoxidizing composition may also comprise a Group VIB metal. In an example, the Group VIB metal may be molybdenum. According to the present invention, the source of Group VIB metal in the deoxidizing composition may be in the form of a salt. Non-limiting examples of suitable molybdenum salts include sodium molybdate, lithium molybdate, calcium molybdate, potassium molybdate, ammonium molybdate, molybdenum chloride, molybdenum acetate, molybdenum sulfamate, molybdenum formate, molybdenum lactate, and combinations thereof.

According to the present invention, the Group VIB metal may be present in the deoxidizing composition in an amount of at least 5 ppm based on a total weight of the deoxidizing composition, such as at least 25 ppm, such as 100 ppm, and in some instances, may be present in the deoxidizing composition in an amount of no more than 500 ppm based on total weight of the deoxidizing composition, such as no more than 250 ppm, such as no more than 150 ppm. According to the present invention, the Group VIB metal may be present in the deoxidizing composition in an amount of 5 ppm to 500 ppm based on total weight of the deoxidizing composition, such as 25 ppm to 250 ppm, such as 100 ppm to 150 ppm, such as 40 ppm to 120 ppm.

The deoxidizing composition may further comprise an anion that may be suitable for forming a salt with any of the Group IA, Group IVA, Group IVB, and Group VIB metals described above, such as a halogen, a nitrate, a sulfate, a silicate (orthosilicates and metasilicates), carbonates, hydroxides, and the like.

The deoxidizing composition also may comprise an electropositive metal. As used herein, the term "electropositive metal" refers to metal ions that will be reduced by the metal substrate being treated when the deoxidizing composition contacts the surface of the metallic substrate. As will be appreciated by one skilled in the art, the tendency of chemical species to be reduced is called the reduction potential, is expressed in volts, and is measured relative to the standard hydrogen electrode, which is arbitrarily assigned a reduction potential of zero. The reduction potential for several elements is set forth in Table 1 below (according to the CRC 82$^{nd}$ Edition, 2001-2002). An element or ion is more easily reduced than another element or ion if it has a voltage value, E*, in the following table, that is more positive than the elements or ions to which it is being compared.

TABLE 1

| Reduction Potentials | | |
|---|---|---|
| Element | Reduction half-cell reaction | Voltage, E* |
| Potassium | $K^+ + e \rightarrow K$ | −2.93 |
| Calcium | $Ca^{2+} + 2e \rightarrow Ca$ | −2.87 |
| Sodium | $Na^+ + e \rightarrow Na$ | −2.71 |
| Magnesium | $Mg^{2+} + 2e \rightarrow Mg$ | −2.37 |
| Aluminum | $Al^{3+} + 3e \rightarrow Al$ | −1.66 |
| Zinc | $Zn^{2+} + 2e \rightarrow Zn$ | −0.76 |
| Iron | $Fe^{2+} + 2e \rightarrow Fe$ | −0.45 |
| Nickel | $Ni^{2+} + 2e \rightarrow Ni$ | −0.26 |
| Tin | $Sn^{2+} + 2e \rightarrow Sn$ | −0.14 |
| Lead | $Pb^{2+} + 2e \rightarrow Pb$ | −0.13 |
| Hydrogen | $2H^+ + 2e \rightarrow H_2$ | −0.00 |
| Copper | $Cu^{2+} + 2e \rightarrow Cu$ | 0.34 |
| Mercury | $Hg_2^{2+} + 2e \rightarrow 2Hg$ | 0.80 |
| Silver | $Ag^+ + e \rightarrow Ag$ | 0.80 |
| Gold | $Au^{3+} + 3e \rightarrow Au$ | 1.50 |

Thus, as will be apparent, when the metal substrate comprises one of the materials listed below, such as cold rolled steel, hot rolled steel, steel coated with zinc metal, zinc compounds, or zinc alloys, hot-dipped galvanized steel, galvannealed steel, steel plated with zinc alloy, aluminum alloys, aluminum plated steel, aluminum alloy plated steel, suitable electropositive metals for deposition thereon include, for example, nickel, copper, silver, and gold, as well mixtures thereof.

When the electropositive metal is or includes copper, both soluble and insoluble compounds may serve as the source of copper in the pretreatment composition. For example, the supplying source of copper ions in the pretreatment composition may be a water soluble copper compound. Specific examples of such compounds include, but are not limited to, copper sulfate, copper nitrate, copper pyrophosphate, copper thiocyanate, copper bromide, copper oxide, copper hydroxide, copper chloride, copper fluoride, copper fluorosilicate, copper fluoroborate and copper iodate, as well as copper salts of carboxylic acids in the homologous series formic acid to decanoic acid.

The electropositive metal, if present at all, may be present in the deoxidizing composition in an amount of at least 2 ppm based on the total weight of the deoxidizing composition, such as at least 4 ppm, such as at least 6 ppm, such as at least 8 ppm, such as at least 10 ppm. The electropositive metal, if present at all, may be present in the deoxidizing composition in an amount of no more than 100 ppm based on the total weight of the deoxidizing composition, such as no more than 80 ppm, such as no more than 60 ppm, such as no more than 40 ppm, such as no more than 20 ppm. The electropositive metal, if present at all, may be present in the deoxidizing composition in an amount of from 2 ppm to 100 ppm based on the total weight of the deoxidizing composition, such as from 4 ppm to 80 ppm, such as from 6 ppm to 60 ppm, such as from 8 ppm to 40 ppm, such as from 10 ppm to 20 ppm.

A source of fluoride may be present in the deoxidizing composition described herein. The fluoride may be present in the deoxidizing composition as either free fluoride and/or bound fluoride. The free fluoride may be derived from a compound or complex comprising the Group IVA and/or the Group IVB metals described above and/or may be derived from a compound or complex other than a compound or complex comprising the Group IVA and/or the Group IVB metals. As used herein the amount of fluoride disclosed or reported in the deoxidizing composition is referred to as "free fluoride," that is, fluoride present in the deoxidizing composition that is not bound to metal ions or hydrogen ions, as measured in part per millions of fluoride. Free fluoride is defined herein as being able to be measured using, for example, an Orion Dual Star Dual Channel Benchtop Meter equipped with a fluoride ion selective electrode ("ISE") available from Thermoscientific, the Symphony® Fluoride Ion Selective Combination Electrode supplied by VWR International, or similar electrodes. See, e.g., Light and Cappuccino, *Determination of fluoride in toothpaste using an ion-selective electrode*, J. Chem. Educ., 52:4, 247-250, April 1975. The fluoride ISE may be standardized by immersing the electrode into solutions of known fluoride concentration and recording the reading in millivolts, and then plotting these millivolt readings in a logarithmic graph. The millivolt reading of an unknown sample can then be compared to this calibration graph and the concentration of fluoride determined. Alternatively, the fluoride ISE can be used with a meter that will perform the calibration calculations internally and thus, after calibration, the concentration of the unknown sample can be read directly.

The free fluoride of the deoxidizing composition may be present in an amount of at least 2 ppm based on a total weight of the deoxidizing composition, such as at least 5 ppm free fluoride, such as at least 10 ppm free fluoride. The free fluoride of the deoxidizing composition may be present in an amount of no more than 50 ppm based on a total weight of the deoxidizing composition, such as no more than 40 ppm free fluoride, such as no more than 25 ppm free fluoride. The free fluoride of the deoxidizing composition may be present in an amount of 2 ppm free fluoride to 50 ppm free fluoride based on a total weight of the deoxidizing composition, such as 5 ppm free fluoride to 40 ppm free fluoride, such as 10 ppm free fluoride to 25 ppm free fluoride.

Optionally, the deoxidizing composition may further comprise a source of phosphate ions. For clarity, when used herein, "phosphate ions" refers to phosphate ions that derive from or originate from inorganic phosphate compounds. For example, in some instances, phosphate ions may be present in an amount of greater than 5 ppm based on total weight of the deoxidizing composition, such as 10 ppm, such as 20 ppm. In some instances, phosphate ions may be present in an amount of no more than 60 ppm based on total weight of the deoxidizing composition, such as no more than 40 ppm, such as no more than 30 ppm. In some instances, phosphate ions may be present in an amount of from 5 ppm to 60 ppm based on total weight of the deoxidizing composition, such as from 10 ppm to 40 ppm, such as from 20 ppm to 30 ppm.

Optionally, the deoxidizing composition may comprise a homopolymer or copolymer comprising a phosphorous-containing monomeric subunit m1 and optionally a non-phosphorous-containing monomeric subunit m2. Any of the monomeric subunits m1 and m2 described herein may be useful in the deoxidizing composition.

The copolymer may be a dipolymer, a terpolymer, or a higher polymer. The homopolymer or copolymer may be a statistical or a block homopolymer or copolymer and may be formed by radical continuous or batchwise polymerization.

As used herein, the term "(meth)acrylic acid," when used with respect to the monomeric units, refers to acrylic and/or methacrylic acid subunits.

As used herein, the term "(meth)acrylate" refers to an acrylate, a methacrylate, or a mixture of acrylate and methacrylate.

As used herein, the terms "homopolymer" and "homopolymer comprising monomeric subunits m1," when used with respect to the homopolymer disclosed herein, refers to a homopolymer resulting from the polymerization of one kind of monomer m1, wherein the homopolymer does not comprise any other monomeric subunits.

As used herein, the terms "copolymer," when used with respect to the present invention, refers to a dipolymer or higher copolymer resulting from the polymerization of at least one kind of monomer m1 and at least one kind of monomer m2 or at least two kinds of monomers m1. For clarity, "copolymer" includes dipolymers, terpolymers, and higher copolymers.

As used herein, the terms "dipolymer," when used with respect to the copolymer of the present invention, refers to a copolymer resulting from the polymerization of one kind monomer m1 and one kind of monomer m2 or two kinds of monomers m1.

As used herein, the terms "terpolymer," when used with respect to the present invention, refers to a copolymer resulting from the polymerization of three monomeric subunit types, where at least one monomer is m1.

Suitable examples of the phosphorous-containing monomeric subunits m1 include organophosphorous compounds containing phosphates, phosphate salts, and/or phosphate esters, phosphonic acids, phosphonic acid salts, and/or phosphonic esters, and/or phosphinic acids, phosphinic acid salts, and/or phosphinic esters. Examples include, but are not limited to, vinyl phosphonic acid, dimethyl vinyl phosphonate, diethyl vinyl phosphonate, or other dialkyl vinyl phosphonates, maleic acid dimethyl phosphonate, maleic acid diethyl phosphonate, phosphate-, phosphonate-, or phosphinate-substituted methacrylate or acrylate monomers, phosphate-, phosphonate-, or phosphinate-substituted acrylamide monomers, or other monomers containing phosphorus-containing substituents and a polymerizable bond.

Suitable examples of phosphorous-containing monomeric subunits m1 include those comprising the structure of Formula I:

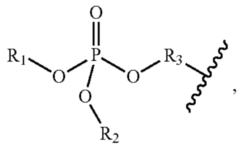

wherein $R_1$ and $R_2$ comprise hydrogen, a cation, an alkyl radical, an aryl radical, or a phosphoester group, and $R_3$ comprises an organic linking group terminating in an atom that is covalently bonded to an atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Other suitable examples of phosphorous-containing monomeric subunits m1 include those comprising the structure of Formula II:

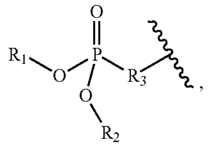

wherein $R_1$ and $R_2$ comprises hydrogen, a cation, an alkyl radical, an aryl radical, or a phosphoester group, wherein $R_1$ and $R_2$ may be the same or different, and wherein $R_3$ comprises an organic linking group terminating in an atom that is covalently bonded to a carbon atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Further suitable examples of phosphorous-containing monomeric subunits m1 include those comprising the structure of Formula III:

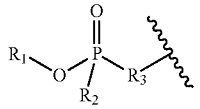

wherein $R_1$ comprises hydrogen, a cation, an alkyl radical, an aryl radical, or a phosphoester group, $R_2$ comprises hydrogen, an alkyl radical, or an aryl radical, and $R_3$ comprises an organic linking group terminating in an atom that is covalently bonded to an atom present in the addition polymer backbone. The organic linking group may comprise at least one carbon atom, and may comprise additional functional groups, such as, for example, one or more ether, amine, or hydroxyl functional groups, among other functional groups, and at least a portion of the organic linking group may comprise a polyether if at least two ether groups are present. The organic linking group may comprise an organic chain, and the organic chain may terminate in a carbon atom on either side of the chain.

Further suitable examples of phosphorus-containing monomeric subunits m1 include those comprising a polymerizable double bond and a phosphorus containing functional group such as a phosphine, phosphine oxide, phosphonium salt, or phosphate amide.

Monomeric subunit m2 may be any non-phosphorous-containing monomer that is capable of co-polymerizing with monomer subunits m1. For example, m2 may be a carboxylic acid- or anhydride-containing monomeric subunit.

Monomeric subunit m2 may be an acid or anhydride functional ethylenically unsaturated monomer. Suitable examples of monomeric subunits m2 include methacrylic acid, acrylic acid, maleic acid or its anhydride, fumaric acid, itaconic acid or its anhydride.

Monomeric subunit m2 also may be a (meth)acrylate. Suitable examples of (meth)acrylate monomeric subunits m2 include alkyl esters of (meth)acrylic acid. Non-limiting examples of alkyl esters of (meth)acrylic acid include methyl (meth)acrylate, ethyl (meth)acrylate and propyl (meth)acrylate. Other suitable examples of monomeric subunit m2 include (meth)acrylamides, such as N-isopropyl acrylamide, esters of maleic acid, fumaric acid, or itaconic acid, vinyl monomers such as styrenics, such as styrene sulfonic acid, vinyl ethers, or other monomers containing a polymerizable double bond, such as N-vinylpyrrolidone.

In an example, the copolymer disclosed herein may include a dipolymer comprising subunits m1 and m2 and having the structure of Formula IV:

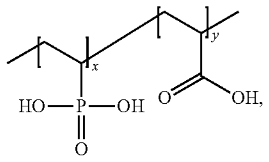

where x varies from greater than 5 to 100 mol % and y varies from 0 to 95 mol %.

Monomeric subunit m1 may be present in the homopolymer or copolymer in an amount of at least 5 molar percent based on total molarity of the homopolymer or copolymer, such as at least 20 molar percent, such as at least 40 molar percent, and may, in some instances, be present in the homopolymer or copolymer an amount of 100 molar percent based on total molarity of the homopolymer or copolymer, such as no more than 80 molar percent, such as no more than 70 molar percent. Monomeric subunit m1 may be present in the homopolymer or copolymer in an amount of 5 molar percent to 100 molar percent based on total molarity of the homopolymer or copolymer, such as 20 molar percent to 80 molar percent, such as 40 molar percent to 70 molar percent.

Monomeric subunit m2 may be absent from the homopolymer or copolymer. Monomeric subunit m2 may be present in the homopolymer or copolymer disclosed herein, if at all, in an amount of at least 0.1 molar percent based on total molarity of the homopolymer or copolymer, such as at least 20 molar percent, such as at least 30 molar percent, and may, in some instances, be present in the homopolymer or copolymer an amount of 95 molar percent based on total molarity of the homopolymer or copolymer, such as at least 80 molar percent, such as at least 30 molar percent. Monomeric subunit m2, if present at all, may be present in the homopolymer or copolymer in an amount of 0.1 molar percent to 95 molar percent based on total molarity of the homopolymer or copolymer, such as 20 molar percent to 80 molar percent, such as 30 molar percent to 60 molar percent.

The homopolymer or copolymer, if present at all, may be present in the deoxidizing composition in an amount of at least 100 ppm based on total weight of the deoxidizing composition, such as at least 150 ppm, such as at least 300 ppm, such as at least 400 ppm, and may, in some instances, be present in the deoxidizing composition in an amount of no more than 3000 ppm based on total weight of the deoxidizing composition, such as no more than 1000 ppm, such as no more than 750 ppm, such as no more than 600 ppm. The homopolymer or copolymer, if present at all, may be present in the deoxidizing composition in an amount of 100 ppm to 3000 ppm based on total weight of the deoxidizing composition, such as 150 ppm to 1000 ppm, such as 300 ppm to 750 ppm, such as 400 ppm to 600 ppm.

The pH of the deoxidizing composition may be at least 1.0, such as at least 2.0, and in some instances may be 3.0 or less, such as 2.5 or less. The pH of the deoxidizing composition may, in some instances, be 1.0 to 3.0, such as 2.0 to 2.5, and may be adjusted using, for example, any acid and/or base as is necessary. The pH of the deoxidizing composition may be maintained through the inclusion of an acidic material, including water soluble and/or water dispersible acids, such as nitric acid, sulfuric acid, and/or phosphoric acid. The pH may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

Also disclosed herein is a cleaner composition comprising the homopolymer or copolymer comprising a phosphorous-containing monomeric subunit m1 and optionally a non-phosphorous-containing monomeric subunit m2 described above with respect to the deoxidizing composition. Any of the monomeric subunits m1 and m2 that may be used in the cleaner composition are the same as those described above with respect to the deoxidizing composition and therefore are not repeated herein.

The homopolymer or copolymer, if present at all, may be present in the cleaner composition in an amount of at least 60 ppm based on total composition, such as at least 120 ppm, and may be present in the cleaner composition in an amount of no more than 3000 ppm based on total composition, such as no more than 1800 ppm. The homopolymer or copolymer, if present at all, may be present in the cleaner composition in an amount of 60 ppm to 3000 ppm based on total composition, such as 120 ppm to 1800 ppm.

The pH of the cleaner composition may be at least 1.0, such as at least 2.0, such as at least 3.0, and in some instances may be 6.0 or less, such as 5.0 or less, such as 4.0 or less. The pH of the cleaner composition may be at least 8.0, such as at least 9.0, and in some instances may be 12.0 or less, such as 11.0 or less. The pH of the cleaner composition may be at least 5.0, such as at least 6.0, and in some instances may be 9.0 or less, such as 8.0 or less. The pH of the cleaner composition may be 1.0 to 6.0, such as 2.0 to 5.0, such as 3.0 to 4.0. The pH of the cleaner composition may be 8.0 to 12.0, such as 9.0 to 11.0. The pH of the cleaner composition may be 5.0 to 9.0, such as 6.0 to 8.0. The pH of the cleaner composition may be adjusted using, for example, any acid and/or base as is necessary. The pH of the cleaner composition may be maintained through the inclusion of an acidic material, including water soluble and/or water dispersible acids, such as nitric acid, sulfuric acid, and/or phosphoric acid. The pH may be maintained through the inclusion of a basic material, including water soluble and/or water dispersible bases, such as sodium hydroxide, sodium carbonate, potassium hydroxide, ammonium hydroxide, ammonia, and/or amines such as triethylamine, methylethyl amine, or mixtures thereof.

Also disclosed herein is a seal composition comprising the homopolymer or copolymer comprising a phosphorous-containing monomeric subunit m1 and optionally a non-phosphorous-containing monomeric subunit m2 described above with respect to the deoxidizing composition. Any of the monomeric subunits m1 and m2 that may be used in the seal composition are the same as those described above with respect to the deoxidizing composition and therefore are not repeated herein.

The homopolymer or copolymer may be present in the seal composition in an amount of 0.5 percent by weight based on total weight of the seal composition, such as 1 percent by weight, such as 5 percent by weight, and may be present in an amount of no more than 20 percent by weight based on total weight of the seal composition, such as no more than 15 percent by weight. The homopolymer or copolymer may be present in the seal composition in an amount of 0.5 percent by weight to 20 percent by weight based on total weight of the seal, such as 5 percent by weight to 15 percent by weight.

The seal composition may have a solids content of at least 2500 ppm based on total weight of seal composition, such as at least 5000 ppm, such as at least 25,000 ppm, and may have a solids content of no more than 100,000 ppm based on total weight of the seal composition, such as no more than 75,000 ppm. The seal composition may have a solids content of 2500 ppm to 100,000 ppm based on total weight of the seal composition, such as 5000 ppm to 75,000 ppm, such as 25,000 ppm to 75,000 ppm.

The seal composition optionally may further comprise at least one transition metal. The transition metal may be, for example, an metal of Group IIIB, Group IVA, Group IVB, Group VB, Group VIB, Group VIIB, and/or Group IIB.

The Group IIIB metal useful in the seal composition may comprise yttrium, scandium, or combinations thereof.

Suitable Group IVA metals that may be useful in the seal composition are the same as those described above with respect to the deoxidizing composition and therefore are not repeated herein.

Suitable Group IVB metals that may be useful in the seal composition are the same as those described above with respect to the deoxidizing composition and therefore are not repeated herein.

Suitable Group VB metals that may be useful in the seal composition may comprise vanadium.

Suitable Group VIB metals that may be useful in the seal composition, for example, may comprise molybdenum, such as any of the molybdenum-containing compounds described above with respect to the deoxidizing composition and therefore not repeated herein. In other examples, the Group VIB metal useful in the seal composition may comprise trivalent chrome or hexavalent chrome.

Suitable Group VIIB metals that may be useful in the seal composition may comprise manganese or rhenium.

Suitable Group IIB metals that may be useful in the seal composition may comprise zinc.

The transition metal(s) may be present in the seal composition in a total amount of at least 5 ppm transition metal(s) based on total weight of the seal composition, such as at least 10 ppm transition metal (s), such as at least 20 ppm transition metal(s). The transition metal(s) may be present in the seal composition in a total amount of no more than 500 ppm transition metal(s) based on total weight of the seal composition, such as no more than 300 ppm transition metal(s), such as no more than 200 ppm transition metal(s). The transition metal(s) may be present in the seal composition in a total amount of 5 ppm to 500 ppm transition metal based on total weight of the seal composition, such as 10 ppm to 300 ppm, such as 20 ppm to 200 ppm. As used herein, the term “total amount,” when used with respect to the amount of transition metals in the seal composition, means the sum of all transition metals present in the seal composition. Alternatively, the seal composition may be substantially free, or essentially free, or completely free, of transition metals.

The seal composition may further comprise a foam depressor, including by way of non-limiting example Foam Depressor 304 CK (commercially available from PPG Industries, Inc.). Those skilled in the art of surface treatment technologies understand that foam in a seal composition bath may have a negative impact on substrate wetting and the appearance or quality of a film formed by a seal composition. Accordingly, foam depressors may be added to the composition to prevent the formation of foam or to break foam already present, particularly in spray applications. Defoaming surfactants may optionally be present at levels up to 1 weight percent based on total weight of the seal composition, such as up to 0.1 percent by weight, and wetting agents are typically present at levels up to 2 percent by weight based on total weight of the seal composition, such as up to 0.5 percent by weight.

The seal composition may have a pH of less than 6, such as 2 to 6, such as 2.5 to 5.5, and may be adjusted using, for example, any acid and/or base as is necessary as described above with respect to the deoxidizing composition.

The deoxidizing compositions, cleaner compositions, post-rinse compositions, and/or seal compositions (collectively, "the treatment compositions") may comprise a carrier, such as an aqueous medium, so that the composition is in the form of a solution or dispersion of the metals in the carrier. The treatment compositions optionally may contain other materials such as nonionic surfactants and auxiliaries conventionally used in the art of substrate protection. In the aqueous medium, water dispersible organic solvents, for example, alcohols with up to about 8 carbon atoms such as methanol, isopropanol, and the like, may be present; or glycol ethers such as the monoalkyl ethers of ethylene glycol, diethylene glycol, or propylene glycol, and the like. When present, water dispersible organic solvents are typically used in amounts up to about ten percent by volume based on the total volume of aqueous medium.

Other optional materials that may be included in the treatment compositions disclosed herein include surfactants that function as defoamers or substrate wetting agents. Anionic, cationic, amphoteric, and/or nonionic surfactants may be used. Defoaming surfactants may optionally be present at levels up to 1 weight percent, such as up to 0.1 percent by weight, and wetting agents are typically present at levels up to 2 percent, such as up to 0.5 percent by weight based on the total weight of the composition.

Optionally, any of the treatment compositions described herein may exclude chromium or chromium-containing compounds. As used herein, the term "chromium-containing compound" refers to materials that include trivalent and/or hexavalent chromium. Non-limiting examples of such materials include chromic acid, chromium trioxide, chromic acid anhydride, dichromate salts, such as ammonium dichromate, sodium dichromate, potassium dichromate, and calcium, barium, magnesium, zinc, cadmium, strontium dichromate, chromium(III) sulfate, chromium(III) chloride, and chromium(III) nitrate. When a composition or a material deposited on a substrate surface by contacting the substrate surface is substantially free, essentially free, or completely free of chromium, this includes chromium in any form, such as, but not limited to, the trivalent and hexavalent chromium-containing compounds listed above.

Thus, optionally, any of the treatment compositions disclosed herein and/or material deposited on a substrate surface by any of these compositions may be substantially free, may be essentially free, and/or may be completely free of one or more of any of the elements or compounds listed in the preceding paragraph. A composition or a material deposited on a substrate surface by a composition that is substantially free of chromium or chromium-containing compounds means that chromium or derivatives thereof are not intentionally added, but may be present in trace amounts, such as because of impurities or unavoidable contamination from the environment. In other words, the amount of material is so small that it does not affect the properties of the composition or deposited material; in the case of chromium, this may further include that the element or compounds thereof are not present in the composition and/or deposited material in such a level that it causes a burden on the environment. The term "substantially free" means that the composition and/or deposited material contain less than 10 ppm of any or all of the elements or compounds listed in the preceding paragraph based on total weight of the composition or the total weight of a coating formed on the substrate, if any at all. The term "essentially free" means that the composition and/or deposited material contain less than 1 ppm of any or all of the elements or compounds listed in the preceding paragraph, if any at all. The term "completely free" means that the compositions and/or deposited material contain less than 1 ppb of any or all of the elements or compounds listed in the preceding paragraph, if any at all.

Optionally, any of the treatment compositions described herein may exclude phosphate ions or phosphate-containing compounds and/or the formation of sludge, such as aluminum phosphate, iron phosphate, and/or zinc phosphate, formed in the case of using a treating agent based on zinc phosphate. As used herein, "phosphate-containing compounds" include compounds containing the element phosphorous such as ortho phosphate, pyrophosphate, metaphosphate, tripolyphosphate, organophosphonates, and the like, and can include, but are not limited to, monovalent, divalent, or trivalent cations such as: sodium, potassium, calcium, zinc, nickel, manganese, aluminum and/or iron. When a composition and/or a material deposited on a substrate surface by deposition of the composition is substantially free, essentially free, or completely free of phosphate, this includes phosphate ions or compounds containing phosphate in any form.

Thus, any of the treatment compositions and/or a material deposited on a substrate surface by deposition of the compositions may be substantially free, or in some cases may be essentially free, or in some cases may be completely free, of one or more of any of the ions or compounds listed in the preceding paragraph. A composition and/or deposited material that is substantially free of phosphate means that phosphate ions or compounds containing phosphate are not intentionally added, but may be present in trace amounts, such as because of impurities or unavoidable contamination from the environment. In other words, the amount of material is so small that it does not affect the properties of the composition; this may further include that phosphate is not present in the composition and/or deposited materials in such a level that they cause a burden on the environment. The term "substantially free" means that a compositions and/or deposited material contain less than 5 ppm of any or all of the phosphate anions or compounds listed in the preceding paragraph based on total weight of the composition or the coating formed on the substrate, respectively, if any at all. The term "essentially free" means that the composition and/or deposited material less than 1 ppm of any or all of the phosphate anions or compounds listed in the preceding paragraph. The term "completely free" means that the composition and/or deposited material contain less than 1 ppb of any or all of the phosphate anions or compounds listed in the preceding paragraph, if any at all.

The present invention is also directed to a system for treating a substrate. The system may comprise, or consist essentially of, or consist of: a cleaner composition; and/or a deoxidizing composition comprising a Group IVA element and/or a Group IVB element and free fluoride, wherein the deoxidizing composition has a pH of 1.0 to 3.0; and/or a post-rinse composition comprising a homopolymer or copolymer; and/or a seal composition comprising a homopolymer or copolymer; and a coating composition. In examples, the coating composition may comprise an adhesive composition, a film-forming resin, or the like. The adhesive composition may comprise either a 1K or a 2K adhesive composition. For example, the adhesive composition may comprise, or consist essentially of, or consist of, an epoxy-containing component and a curing agent that chemically reacts with the epoxy-containing component. Such chemical reaction may form a bond (i.e., a crosslink) to provide the substrate to which it is applied desirable bonding characteristics.

The adhesive composition may comprise an epoxy compound. Suitable epoxy compounds that may be used include monoepoxides, polyepoxides, or combinations thereof.

Suitable monoepoxides that may be used include monoglycidyl ethers of alcohols and phenols, such as phenyl glycidyl ether, n-butyl glycidyl ether, cresyl glycidyl ether, isopropyl glycidyl ether, glycidyl versatate, for example, CARDURA E available from Shell Chemical Co., and glycidyl esters of monocarboxylic acids such as glycidyl neodecanoate, and mixtures of any of the foregoing.

Useful epoxy-containing components that can be used include polyepoxides (having an epoxy functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other useful polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides containing oxyalkylene groups in the epoxy molecule, and epoxy novolac resins. Still other non-limiting epoxy compounds include epoxidized Bisphenol A novolacs, epoxidized phenolic novolacs, epoxidized cresylic novolac, isosorbide diglycidyl ether, triglycidyl p-aminophenol, and triglycidyl p-aminophenol bismaleimide, triglycidyl isocyanurate, tetraglycidyl 4,4'-diaminodiphenylmethane, and tetraglycidyl 4,4'-diaminodiphenylsulphone. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid). The epoxy-containing compound may also comprise a carboxyl-terminated butadiene-acrylonitrile homopolymer or copolymer modified epoxy-containing compound. The epoxy-containing compound may also comprise epoxidized castor oil. The epoxy-containing compound may also comprise an epoxy-containing acrylic, such as glycidyl methacrylate.

The epoxy-containing compound may comprise an epoxy-adduct. The composition may comprise one or more epoxy-adducts. As used herein, the term “epoxy-adduct” refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzopherone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

Other suitable epoxy-containing components include epoxy-adducts such as epoxy polyesters formed as the reaction product of reactants comprising an epoxy-containing compound, a polyol and an anhydride, as described in U.S. Pat. No. 8,796,361, col. 3, line 42 through col. 4, line 65, the cited portion of which is incorporated herein by reference.

The epoxy-containing component may have an average epoxide functionality of greater than 1.0, such as at least 1.8, and may have an average epoxide functionality of less than 3.2, such as no more than 2.8. The epoxy-containing component may have an average epoxide functionality of greater than 1.0 to less than 3.2, such as 1.8 to 2.8. As used herein, the term "average epoxide functionality" means the molar ratio of epoxide functional groups to epoxide-containing molecules in the composition.

According to the present invention, the epoxy-containing component may be present in the composition in an amount of at least 10% by weight based on total weight of the adhesive composition, such as at least 25% by weight, such as at least 45% by weight, such as at least 55% by weight, and in some cases may be present in the adhesive composition in an amount of no more than 90% by weight based on total weight of the adhesive composition, such as no more than 85% by weight. According to the present invention, the epoxy-containing component may be present in the adhesive composition in an amount of from 10% to 90% by weight based on the total composition weight, such as from 25% to 90% by weight, such as 45% to 90% by weight, such as from 55% to 85%.

The epoxy equivalent weight of the epoxy-containing component of the adhesive composition may be at least 40 g/eq, such as at least 74 g/eq, such as at least 160 g/eq, such as at least 200 g/eq, such as at least 500 g/eq, such as at least 1,000 g/eq, and in some cases may be no more than 2,000 g/eq, such as no more than 1,000 g/eq, such as no more than 500 g/eq, such as no more than 200 g/eq. The epoxy equivalent weight of the epoxy-containing component of the coating composition can range from 40 g/eq to 2,000 g/eq, such as from 100 g/eq to 1,000 g/eq, such as from 160 g/eq to 500 g/eq. As used herein, the "epoxy equivalent weight" is determined by dividing the molecular weight of the epoxy-containing component by the number of epoxy groups present in the epoxy-containing component.

The molecular weight (Mw) of the epoxy-containing component of the coating composition may be at least 40 g/mol, such as at least 74 g/mol, such as at least 198 g/mol, such as at least 310 g/mol, such as at least 500 g/mol, such as at least 1,000 g/mol, and in some cases no more than 20,000 g/mol, such as no more than 4,000 g/mol, such as no more than 2,000 g/mol, such as no more than 400 g/mol, such as no more than 300 g/mol. The molecular weight of the epoxy-containing component of the adhesive composition can range from 40 g/mol to 20,000 g/mol, such as from 198 g/mol to 4,000 g/mol, such as from 310 g/mol to 2,000 g/mol, such as from 500 g/mol to 1,000 g/mol.

The coating composition may further comprise elastomeric particles. As used herein, "elastomeric particles" refers to particles comprised of one or more materials having at least one glass transition temperature (Tg) of greater than −150° C. and less than 30° C., calculated, for example, using the Fox Equation. The elastomeric particles may be phase-separated from the epoxy-containing component. As used herein, the term "phase-separated" means forming a discrete domain within a matrix of the epoxy-containing component.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, or combinations thereof.

The average particle size of the elastomeric particles may be at least 20 nm, as measured by transmission electron microscopy (TEM), such as at least 30 nm, such as at least 40 nm, such as at least 50 nm, and may be no more than 400 nm, such as no more than 300 nm, such as no more than 200 nm, such as no more than 150 nm. The average particle size of the elastomeric particles may be 20 nm to 400 nm as measured by TEM, such as 30 nm to 300 nm, such as 40 nm to 200 nm, such as 50 nm to 150 nm. Suitable methods of measuring particle sizes by TEM include suspending elastomeric particles in a solvent selected such that the particles do not swell, and then drop casting the suspension onto a TEM grid which is allowed to dry under ambient conditions. For example, epoxy resin containing core-shell rubber elastomeric particles from Kaneka Texas Corporation can be diluted in butyl acetate for drop casting. Particle size measurements may be obtained from images acquired using a Tecnai T20 TEM operating at 200 kV and analyzed using ImageJ software, or an equivalent instrument and software.

According to the present invention, the elastomeric particles may optionally be included in an epoxy carrier resin, an amine carrier resin, and/or a thiol carrier resin for introduction into the adhesive composition. Suitable resins may include a mixture or resins. Suitable finely dispersed core-shell elastomeric particles may be master-batched in epoxy resin such as aromatic epoxides, phenolic novolac epoxy resin, bisphenol A and/or bisphenol F diepoxide, and/or aliphatic epoxides, which include cyclo-aliphatic epoxides. Suitable finely dispersed core-shell elastomeric particles may be master-batched in amine resin such as those described above. Suitable finely dispersed core-shell elastomeric particles may be master-batched in thiol- or epoxy-resins such as those described herein. In examples, the elastomeric particles may be included in an epoxy carrier resin, an amine carrier resin, and/or a thiol carrier resin at concentrations ranging from 1% to 80% core-shell elastomeric particles by weight based on the total weight of the elastomeric dispersion, such as from 5% to 50%, such as from 15% to 35%. When utilized, the epoxy carrier resin may be an epoxy-containing component such that the weight of the epoxy-containing component present in the coating composition includes the weight of the epoxy carrier resin.

Exemplary non-limiting commercial core-shell elastomeric particle products using poly(butadiene) rubber particles that may be utilized in the coating composition may include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), each available from Kaneka Texas Corporation.

Exemplary non-limiting commercial core-shell elastomeric particle products using styrene-butadiene rubber particles that may be utilized in the coating composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation.

Exemplary non-limiting commercial core-shell elastomeric particle products using polysiloxane rubber particles that may be utilized in the coating composition may include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonick), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

In examples, the elastomeric particles may be present in the adhesive composition in an amount of at least 0.1% by weight based on total weight of the adhesive composition, such as at least 0.5% by weight, and in some cases may be present in the adhesive composition in an amount of no more than 11% by weight based on total weight of the adhesive composition, such as no more than 6% by weight. According to the present invention, the elastomeric particles may be present in the adhesive composition in an amount of 0.1% to 11% by weight based on total weight of the adhesive composition, such as 0.5% by weight to 6% by weight.

In other examples, the elastomeric particles may be present in the adhesive composition in an amount of greater than 11% by weight based on the total composition weight, such as at least 15%, and in some cases may be present in the adhesive composition in an amount of no more than 40% by weight based on the total composition weight, such as no more than 35%, such as no more than 25%. According to the present invention, the elastomeric particles may be present in the adhesive composition in an amount of greater than 11% to 40% by weight based on the total composition weight, such as greater than 11% to 25%, such as from 15% to 25%.

In other examples, elastomeric particles may be present in the adhesive composition in an amount of at least 0.1% by weight based on the total composition weight, such as at least 11% by weight, and in some cases may be present in the adhesive composition in an amount of no more than 40% by weight based on the total composition weight, such as no more than 25% by weight. According to the present invention, the elastomeric particles may be present in the adhesive composition in an amount of 0.1% to 40% by weight based on the total composition weight, such as 11% to 25% by weight.

In other examples, the elastomeric particles may be present in the composition in an amount of greater than 11% by weight based on the total composition weight, such as at least 15%, and in some cases may be present in the composition in an amount of no more than 40% by weight based on the total composition weight, such as no more than 35%, such as no more than 25%. The elastomeric particles may be present in the composition in an amount of from greater than 11% to 40% by weight based on the total composition weight, such as greater than 11% to 25%, such as from 15% to 25%.

Optionally, at least 50% by weight of the elastomeric particles may comprise a styrene butadiene core based on total weight of the elastomeric particles in the coating composition. For example, elastomeric particles comprising a styrene butadiene core may be present in the coating composition in an amount of at least 50% by weight based on total weight of the elastomeric particles, such as at least 65% by weight, such as at least 75% by weight, and may be present in an amount of 100% by weight based on total weight of elastomeric particles in the coating composition, such as no more 95% by weight, such as no more than 90% by weight. Elastomeric particles comprising a styrene butadiene core may be present in the coating composition in an amount of 50% by weight to 100% by weight based on total weight of the elastomeric particles in the coating composition, such as 65% by weight to 95% by weight, such as 75% by weight to 90% by weight.

Optionally, at least 50% by weight of the elastomeric particles may have an average particle size (based on TEM as described herein) of no more than 150 nm based on total weight of the elastomeric particles in the coating composition, such as 50 nm to 150 nm. For example, elastomeric particles having an average particle size (based on TEM as described herein) of no more than 150 nm, such as 50 nm to 150 nm, may be present in the coating composition in an amount of at least 50% by weight based on total weight of the elastomeric particles, such as at least 65% by weight, such as at least 75% by weight, and may be present in an amount of 100% by weight based on total weight of elastomeric particles in the coating composition, such as no more 95% by weight, such as no more than 90% by weight. Elastomeric particles having an average particle size of 150 nm (based on TEM as described herein), such as 50 nm to 150 nm, may be present in the coating composition in an amount of 50% by weight to 100% by weight based on total weight of the elastomeric particles in the coating composition, such as 65% by weight to 95% by weight, such as 75% by weight to 90% by weight.

Optionally, no more than 50% by weight of the elastomeric particles comprise a polybutadiene core based on total weight of the elastomeric particles in the coating composition. For example, if elastomeric particles containing a polybutadiene core are present at all, they may be present in an amount of at least 5% by weight based on total weight of the elastomeric particles, such as at least 10%, and may be present in an amount of no more than 50% by weight based on total weight of the elastomeric particles, such as no more than 35% by weight, such as no more than 25% by weight. Elastomeric particles containing a polybutadiene core may be present in the coating composition in an amount of 0% by weight to 50% by weight based on total weight of the elastomeric particles, such as 5% by weight to 35%, such as 10% by weight to 25% by weight.

Optionally, no more than 50% by weight of the elastomeric particles comprise a polysiloxane core based on total weight of the elastomeric particles in the coating composition. For example, if elastomeric particles containing a polysiloxane core are present at all, they may be present in an amount of at least 5% by weight based on total weight of the elastomeric particles, such as at least 10%, and may be present in an amount of no more than 50% by weight based on total weight of the elastomeric particles, such as no more than 35% by weight, such as no more than 25% by weight. Elastomeric particles comprising a polysiloxane core may be present in the coating composition in amount of 0% by weight to 50% by weight based on total weight of the elastomeric particles, such as 5% by weight to 35%, such as 10% by weight to 25% by weight.

The adhesive composition of the present invention also comprises a curing agent that is capable of reacting with the epoxy-containing component. For example, the curing agent may comprise active hydrogen functional groups including amine functional groups, hydroxy functional groups, thiol functional groups and combinations thereof. Suitable curing agents that may be used in the adhesive compositions of the present invention may comprise an amine, an amine-adduct, a thiol, or combinations thereof. The curing agent may be blocked or unblocked or encapsulated or unencapsulated.

Suitable amines for use in the present invention can be selected from a wide variety of known amines such as primary and secondary amines, and mixtures thereof. The amine may include monoamines, or polyamines having at least two functional groups such as di-, tri-, or higher functional amines; and mixtures thereof. The amine may be aromatic or aliphatic such as cycloaliphatic, or mixtures thereof. Non-limiting examples of suitable amines may include aliphatic polyamines such as but not limited to ethylamine, isomeric propylamines, butylamines, pentylamines, hexyl amines, cyclohexylamine, ethylene diamine, 1,2-diaminopropane, 1,4-diaminobutane, 1,3-diaminopentane, 1,6-diaminohexane, 2-methyl-L5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluoylene diamine, 2,4'- and/or 4,4'-diamino-dicyclohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene and 2,4'- and/or 4,4'-diaminodiphenyl methane, or mixtures thereof.

Non-limiting examples of secondary amines can include mono- and poly-acrylate and methacrylate modified amines; polyaspartic esters which can include derivatives of compounds such as maleic acid, fumaric acid esters, aliphatic polyamines and the like; and mixtures thereof. The secondary amine may include an aliphatic amine, such as a cycloaliphatic diamine. Such amines are available commercially from Huntsman Corporation (Houston, TX) under the designation of JEFFLINK such as JEFFLINK 754.

The amine can include an amine-functional resin. Suitable amine-functional resins can be selected from a wide variety known in the art and can include those having relatively low viscosity. The amine-functional resin may be an ester of an organic acid, for example, an aspartic ester-based amine-functional reactive resin that is reactive with isocyanate. The isocyanate may be solvent-free, and/or has a mole ratio of amine-functionality to the ester of no more than 1:1 so that no excess primary amine remains upon reaction. A non-limiting example of such polyaspartic esters may include the derivative of diethyl maleate and 1,5-diamino-2-methylpentane, which is available commercially from Covestro under the trade name DESMOPHEN NH1220. Other suitable compounds containing aspartate groups may be employed as well.

The amine may include high molecular weight primary amines, such as but not limited to polyoxyalkyleneamine. Suitable polyoxyalkyleneamines may contain two or more primary amino groups attached to a backbone derived, for example, from propylene oxide, ethylene oxide, or mixtures thereof. Non-limiting examples of such amines may include those available under the designation JEFFAMINE from Huntsman Corporation. Such amines may have a molecular weight ranging from 200 to 7500, such as but not limited to JEFFAMINE D-230, D-400, D-2000, T-403, T-5000, XJS-616, and ED600. Other suitable amines include aliphatic and cycloaliphatic polyamines such as the Ancamine® series available from Evonik.

By way of non-limiting example, the curing agent may be a guanidine. It will be understood that “guanidine,” as used herein, refers to guanidine and derivatives thereof. For example, the curing component that may be used includes guanidines, substituted guanidines, substituted ureas, melamine resins, guanamine derivatives, heat-activated cyclic tertiary amines, aromatic amines and/or mixtures thereof. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, more especially, cyanoguanidine (dicyandiamide, e.g. Dyhard® available from AlzChem). Representatives of suitable guanamine derivatives which may be mentioned are alkylated benzoguanamine resins, benzoguanamine resins or methoxymethylethoxymethylbenzoguanamine.

For example, the guanidine may comprise a compound, moiety, and/or residue having the following general structure of Formula V:

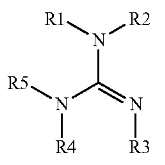

(I)

wherein each of R1, R2, R3, R4, and R5 (i.e., substituents of formula (V)) comprise hydrogen, (cyclo)alkyl, aryl, aromatic, organometallic, a polymeric structure, or together can form a cycloalkyl, aryl, or an aromatic structure, and wherein R1, R2, R3, R4, and R5 may be the same or different. As used herein, "(cyclo)alkyl" refers to both alkyl and cycloalkyl. When any of the R groups "together can form a (cyclo)alkyl, aryl, and/or aromatic group", it is meant that any two adjacent R groups are connected to form a cyclic moiety, such as the rings in formulae (VI)-(IX) below.

It will be appreciated that the double bond between the carbon atom and the nitrogen atom that is depicted in formula (V) may be located between the carbon atom and another nitrogen atom of formula (V). Accordingly, the various substituents of formula (V) may be attached to different nitrogen atoms depending on where the double bond is located within the structure.

The guanidine may comprise a cyclic guanidine such as a guanidine of formula (V) wherein two or more R groups of formula (V) together form one or more rings. In other words, the cyclic guanidine may comprise ≥1 ring(s). For example, the cyclic guanidine may either be a monocyclic guanidine (1 ring) such as depicted in formulae (VI) and (VII) below, or the cyclic guanidine may be bicyclic or polycyclic guanidine (≥2 rings) such as depicted in formulae (VIII) and (IX) below.

(VI)

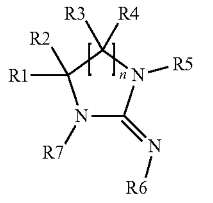

(VII)

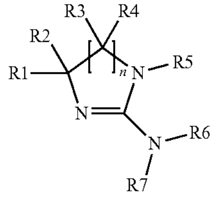

(VIII)

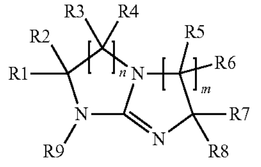

(IX)

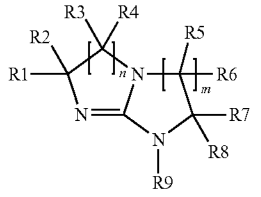

Each substituent of formulae (VI) and/or (VII), R1-R7, may comprise hydrogen, (cyclo)alkyl, aryl, aromatic, organometallic, a polymeric structure, or together can form a cycloalkyl, aryl, or an aromatic structure, and wherein R1-R7 may be the same or different. Similarly, each substituent of formulae (VIII) and (IX), R1-R9, may be hydrogen, alkyl, aryl, aromatic, organometallic, a polymeric structure, or together can form a cycloalkyl, aryl, or an aromatic structure, and wherein R1-R9 may be the same or different. Moreover, in some examples of formulae (VI) and/or (VII), certain combinations of R1-R7 may be part of the same ring structure. For example, R1 and R7 of formula (VI) may form part of a single ring structure. Moreover, it will be understood that any combination of substituents (R1-R7 of formulae (VI) and/or (VII) as well as R1-R9 of formulae (VIII) and/or (IX)) may be chosen so long as the substituents do not substantially interfere with the catalytic activity of the cyclic guanidine.

Each ring in the cyclic guanidine may be comprised of ≥5 members. For example, the cyclic guanidine may comprise a 5-member ring, a 6-member ring, and/or a 7-member ring. As used herein, the term "member" refers to an atom located in a ring structure. Accordingly, a 5-member ring will have 5 atoms in the ring structure ("n" and/or "m"=1 in formulae (VI)-(IX)), a 6-member ring will have 6 atoms in the ring structure ("n" and/or "m"=2 in formulae (VI)-(IX)), and a 7-member ring will have 7 atoms in the ring structure ("n" and/or "m"=3 in formulae (VI)-(IX)). It will be appreciated that if the cyclic guanidine is comprised of ≥2 rings (e.g., formulae (VIII) and (IX)), the number of members in each ring of the cyclic guanidine can either be the same or different. For example, one ring may be a 5-member ring while the other ring may be a 6-member ring. If the cyclic guanidine is comprised of ≥3 rings, then in addition to the combinations cited in the preceding sentence, the number of members in a first ring of the cyclic guanidine may be different from the number of members in any other ring of the cyclic guanidine.

It will also be understood that the nitrogen atoms of formulae (VI)-(IX) may further have additional atoms attached thereto. Moreover, the cyclic guanidine may either be substituted or unsubstituted. For example, as used herein in conjunction with the cyclic guanidine, the term "substituted" refers to a cyclic guanidine wherein R5, R6, and/or R7 of formulae (VI) and/or (VII) and/or R9 of formulae (VIII) and/or (IX) is not hydrogen. As used herein in conjunction with the cyclic guanidine, the term "unsubstituted" refers to a cyclic guanidine wherein R1-R7 of formulae (VI) and/or (VII) and/or R1-R9 of formulae (VIII) and/or (IX) are hydrogen.

The cyclic guanidine may comprise a bicyclic guanidine, and the bicyclic guanidine may comprise 1,5,7-triazabicyclo [4.4.0]dec-5-ene ("TBD" or "BCG") or 7-methyl-1,5,7-triazabicyclo[4.4.0]dec-5-ene ("Methyl TBD" or "MTBD").

In examples, the guanidine may be present in the composition in an amount of at least 0.5% by weight based on total weight of the composition, such as at least 5% by weight, such as at least 7% by weight, and may be present in an amount of no more than 20% by weight based on total weight of the composition, such as no more than 15%, such as no more than 13% by weight, such as no more than 10%. The guanidine may be present in the composition in an amount of 0.5% by weight to 20% by weight based on total weight of the composition, such as 5% by weight to 15% by weight, such as 7% by weight to 13% by weight.

Optionally, the guanidine particles may have a D90 particle size of 25 μm as measured by dynamic light scattering, such as a D90 particle size of 20 μm, such as a D90 particle size of 15 μm, where a D90 particle size means that at least 90% of the total volume of guanidine particles have a diameter of no greater than such particle size in at least one dimension. Particle size analysis by dynamic light scattering may be performed on the guanidine particles in their powder form, prior to dispersion in a coating composition. Useful instruments useful for measuring the D90 include a LS 13 320 Laser Diffraction Particle Size Analyzer (available from Beckman Coulter, using analysis software version 5.01, firmware version 2.02, and the Fraunhofer optical model) or similar instruments.

The curing agent may comprise a polythiol compound. As used herein, a "polythiol compound" refers to a chemical compound having at least two thiol functional groups (—SH) that may be used to "cure" a composition of the present invention by reacting with the epoxy-containing component to form a polymeric matrix.

The polythiol compound comprises a compound comprising at least two thiol functional groups. The polythiol compound may comprise a dithiol, trithiol, tetrathiol, pentathiol, hexathiol or higher functional polythiol compound. The polythiol compound may comprise a dithiol compound such as 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol compound may comprise a trithiol compound such as trimethylolpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy)ethyl]isocyanurate (commercially available as THIOCURE® TEMPIC from BRUNO BOCK Chemische Fabrik GmbH & Co. KG). The polythiol compound may comprise a tetrathiol compound such as pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol compounds may include dipentaerythritol hexa-3-mercaptopropionate (commercially available as THIOCURE® DiPETMP from BRUNO BOCK Chemische Fabrik GmbH & Co. KG). Combinations of polythiol compounds may also be used.

The polythiol compound may comprise a mercaptan terminated polysulfide. Commercially available mercaptan terminated polysulfides include those sold under the trade name THIOKOL® LP from Toray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure HS—(C2H4-O—CH2-O—C2H4-S—S)nC2H4-O—CH2-O—C2H4-SH, wherein n is an integer of 5 to 50. Other commercially available mercaptan terminated polysulfides include those sold under the trade name THIOPLAST® G™ from Akzo Nobel Chemicals International B.V., including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the di-functional unit having the structure HS—(R—S—S)n-R—SH, wherein n is an integer from 7 to 38, and the tri-functional unit having the structure HS—(R—S—S)a-CH2-CH((S—S—R)c-SH)—CH2-(S—S—R)b-SH, wherein a+b+c=n and n is an integer from 7 to 38.

The polythiol compound may comprise a mercaptan terminated polyether. Commercially available mercaptan terminated polyether include POLYTHIOL QE-340M available from Toray Fine Chemicals Co., Ltd.

The polythiol compound may have a thiol equivalent weight of at least 80 g/eq, such as at least 100 g/eq, such as at least 125 g/eq, such as at least 400 g/eq, and may have a thiol equivalent weight of no more than 4,000 g/eq, such as no more than 2,500 g/eq, such as no more than 2,000 g/eq, such as no more than 1,650 g/eq. The polythiol compound may have a thiol equivalent weight of 80 g/eq to 4,000 g/eq, such as 100 g/eq to 2,500 g/eq, such as 125 g/eq to 2,000 g/eq, such as 400 g/eq to 1,650 g/eq.

Suitable polyethers useful in the present invention include those polythioethers having a structure according to formula X $$—R^1—[—S—(CH_2)_2—O—[—R^2—O—]_m—(CH_2)_2—S—R^1—]_n\text{-}0$$

wherein $R^1$ denotes a $C_{2-6}$ n-alkylene, $C_{3-6}$ branched alkylene, $C_{6-8}$cycloalkylene or $C_{6-10}$alkylcycloalkylene group, $—[(—CH_2—)_p—X—]_q—(—CH_2—)_r—$, or $—[(—CH_2—)_p—X—]_q—(—CH_2—)_r—$ in which at least one $—CH_2—$ unit is substituted with a methyl group, $R^2$ denotes a $C_{2-6}$n-alkylene, $C_{2-6}$ branched alkylene, $C_{6-8}$ cycloalkylene or $C_{6-10}$alkylcycloalkylene group, or $—[(—CH_2—)_p—X—]_q—(—CH_2—)_r—$, in which X denotes one selected from the group consisting of 0, S and $—NR^6—$, $R^6$ denotes H or methyl, m is a rational number from 0 to 10, n is an integer from 1 to 60, p is an integer from 2 to 6, q is an integer from 1 to 5, and r is an integer from 2 to 10.

Polythioether polymers useful in the present invention may have a glass transition temperature Tg that is not higher than −50° C., such as not higher than −55° C., such as not higher than −60° C. Low Tg is indicative of good low temperature flexibility, which can be determined by known methods, for example, by the methods described in AMS (Aerospace Material Specification) 3267 § 4.5.4.7, MIL-S (Military Specification)-8802E § 3.3.12 and MIL-S-29574, and by methods similar to those described in ASTM (American Society for Testing and Materials) D522-88 and AMS 3277.

Polythioethers useful in the present invention may have number average molecular weights of at least 500, such as at least 1,000, such as at least 2,000 and may have number average molecular weights of no more than 20,000, such as no more than 10,000, such as no more than 5,000. Polythioethers useful in the present invention may have number average molecular weights of 500 to 20,000, such as 1,000 to 10,000, such as 2,000 to 5,000 measured by gel permeation chromatography (GPC) using polystyrene standards and waters Styragel column in THF solvent.

Polythioether polymers useful in the present invention can be difunctional, that is, linear polymers having two end groups, or polyfunctional, that is, branched polymers having three or more end groups. Depending on the relative amounts of dithiol(s) and divinyl ether(s) used to prepare the polymers, the polymers can have terminal thiol groups (—SH) or terminal vinyl groups (—CH═CH$_2$). Furthermore, the polymers can be uncapped, that is, include thiol or vinyl terminal groups that are not further reacted, or capped, that is, include thiol or vinyl groups that are further reacted with other compounds. Capping the polythioethers of the invention enables introduction of additional terminal functionalities, for example, hydroxyl or amine groups, to the inventive polymers, or in the alternative, introduction of end groups that resist further reaction, such as terminal alkyl groups.

For example, the polythioether may have the formula XI $$A\text{-}(\text{-}[R^3]_y\text{—}R^4)_2$$

wherein A denotes a structure having the formula X, y is 0 or 1, $R^3$ denotes a single bond when y=0 and —S(CH$_2$)$_2$—[O—R$^2$]$_m$—O— when y=1, $R^4$ denotes —SH or —S—(—CH$_2$—)$_{2+s}$—O—R$^5$ when y=0 and —CH$_2$═CH$_2$ or —(CH$_2$—)$_2$—S—R$^5$ when y=1, s is an integer from 0 to 10, $R^5$ denotes $C_{1-6}$ n-alkyl which is unsubstituted or substituted with at least one —OH or —NHR$^7$ group, and $R^7$ denotes H or a $C_{1-6}$ n-alkyl group.

Thus, polythioethers of the formula XI are linear, difunctional polymers which can be uncapped or capped. When y=0, the polymer includes terminal thiol groups or capped derivatives thereof. When y=1, the polymer includes terminal vinyl groups or capped derivatives thereof.

For example, the polythioethers may be a difunctional thiol-terminated (uncapped) polythioether. That is, in formula XI, y=0 and $R^4$ is —SH. Thus, the polythioether has the following structure: HS—R$^1$—[—S—(CH$_2$)$_2$—O—[—R$^2$—O—]$_m$—(CH$_2$)$_2$—S—R$^1$—]$_n$—SH. The foregoing polymers are produced, for example, by reacting a divinyl ether or mixture thereof with an excess of a dithiol or mixture thereof, as discussed in detail below.

In another example of the foregoing polythioether, when m=1 and $R^2$=n-butylene in formula XI, le is not ethylene or n-propylene. For example, when m=1, p=2, q=2, r=2 and $R^2$=ethylene, X is not O.

In another example, the polythioether may be a capped polymer in which the foregoing terminal —SH groups are replaced by —S—(—CH$_2$—)$_{2+s}$—O—R$^5$. Such caps are produced by reaction of the terminal thiol group with an alkyl w-alkenyl ether, such as a monovinyl ether, for example by including in the reaction mixture a capping agent or mixture thereof, as discussed in detail below.

In the foregoing, $R^5$ denotes an unsubstituted or substituted alkyl group, such as a C1-$^6$ n-alkyl group which is unsubstituted or substituted with at least one —OH or —NHR$^7$ group, with $R^7$ denoting H or $C_{1-6}$ n-alkyl. Exemplary useful $R^5$ groups include alkyl groups, such as ethyl, propyl and butyl; hydroxyl-substituted groups such as 4-hydroxybutyl; amine-substituted groups such as 3-aminopropyl; etc.

Polythioethers according to the invention also include difunctional vinyl-terminated (uncapped) polythioethers. That is, in formula XI, y=1 and $R^4$ is —CH═CH$_2$. These polymers are produced, for example, by reacting a dithiol or mixture thereof with an excess of a divinyl ether or mixture thereof, as discussed in detail below. Analogous capped polythioethers include terminal —(CH$_2$—)$_2$—S—R$^5$.

The foregoing polythioethers are linear polymers having a functionality of 2 (considering alkyl and other non-reactive caps within this total). Polythioethers having higher functionality are also within the scope of the present invention. Such polymers are prepared, as discussed in detail below, by using a polyfunctionalizing agent. The term "polyfunctionalizing agent" as employed herein denotes a compound having more than two moieties that are reactive with terminal —SH and/or —CH═CH$_2$ groups. The polyfunctionalizing agent may include from 3 to 6 such moieties, and thus is denoted a "z-valent" polyfunctionalizing agent, where z is the number (such as from 3 to 6) of such moieties included in the agent, and hence the number of separate branches which the polyfunctional polythioether comprises. The polyfunctionalizing agent can be represented by the formula $$B\text{—}(R^8)_z$$

where $R^8$ denotes a moiety that is reactive with terminal —SH or —CH═CH$_2$ and can be the same or different, and B is the z-valent residue of the polyfunctionalizing agent, i.e., the portion of the agent other than the reactive moieties $R^8$.

Polyfunctional polythioethers according to the present invention thus may have the formula XII $$B\text{-}(A\text{-}[R^3]_y\text{—}R^4)_z$$

wherein A denotes a structure having the formula X, y is 0 or 1, $R^3$ denotes a single bond when y=0 and —S—(CH$_2$)$_2$[—O—R$^2$—]$_m$—O— when y=1, $R^4$ denotes —SH or —S—(—CH$_2$—)$_{2+s}$—O—R$^5$ when y=0 and —CH$_2$═CH$_2$ or —(CH$_2$—)$_2$—S—R$^5$ when y=1, $R^5$ denotes $C_{1-6}$ n-alkyl which is unsubstituted or substituted with at least one —OH or —NHR$^7$ group, IC denotes H or a $C_{1-6}$ n-alkyl group, z is an integer from 3 to 6, and B denotes a z-valent residue of a polyfunctionalizing agent.

As with the preceding difunctional polythioethers, the foregoing polyfunctional polythioethers of the present invention can include terminal —SH or —CH═CH$_2$ groups or can be capped and thus include terminal —S—(—CH$_2$—)$_{2+s}$—O—R$^5$ or —(CH$_2$—)$_2$—S—R$^5$ groups. Partially capped polyfunctional polymers, i.e., polymers in which some but not all of the branches are capped, are also within the scope of the present invention.

Specific polyfunctionalizing agents include trifunctionalizing agents, that is, compounds with z=3. Suitable trifunctionalizing agents include triallylcyanurate (TAC), which is reactive with compounds of the structure XI ($R^8$=allyl), and 1,2,3-propanetrithiol, which is reactive with compounds of the formula XII ($R^8$═SH). Agents having mixed functionality, i.e., agents that include moieties (typically separate moieties) that react with both thiol and vinyl groups, can also be employed.

Other useful polyfunctionalizing agents include trimethylolpropane trivinyl ether, and the polythiols described in U.S. Pat. Nos. 4,366,307, 4,609,762 and 5,225,472, the disclosures of each of which are incorporated in their entireties herein by reference. Mixtures of polyfunctionalizing agents can also be used.

Polyfunctionalizing agents having more than three reactive moieties (i.e., z>3) afford "star" polythioethers and hyperbranched polythioethers. For example, two moles of TAC can be reacted with one mole of a dithiol to afford a material having an average functionality of 4. This material can then be reacted with a divinyl ether and a dithiol to yield a polymer, which can in turn be mixed with a trifunctionalizing agent to afford a polymer blend having an average functionality between 3 and 4.

Polythioethers as described above have a wide range of average functionality.

For example, trifunctionalizing agents afford average functionalities from 2.05 to 3.0, such as 2.1 to 2.6. Wider ranges of average functionality can be achieved by using tetrafunctional or higher polyfunctionalizing agents. Functionality will also be affected by factors such as stoichiometry, as is known to those skilled in the art.

Methods of making the foregoing polyfunctional polythioethers are discussed in detail in U.S. Pat. No. 6,172,179, col. 8, line 62 through col. 12, line 22, incorporated herein by reference.

Non-limiting examples of suitable polyols include but are not limited to polyether polyols, polyester polyols, polycaprolactone polyols, polycarbonate polyols, polyurethane polyols, poly vinyl alcohols, polymers containing hydroxy functional acrylates, polymers containing hydroxy functional methacrylates, polymers containing allyl alcohols, hydroxyl functional polybutadienes, and mixtures thereof.

The equivalent ratio of curing agent to epoxy in the adhesive composition may be at least 0.5:1, such as at least 1.0:1, and in some instances may be no more than 1.5:1, such as no more than 1.25:1. As described herein, the equivalents of epoxy used in calculating the equivalent ratio of epoxy are based on the epoxy equivalent weight of the epoxy-containing component. The equivalents of amine used in calculating the equivalent ratio of amine are based on the amine hydrogen equivalent weight (AHEW) of the curing agent. The equivalents of thiol used in calculating the equivalent ratio of thiol are based on the thiol equivalent weight of the thiol-containing component.

The coating composition optionally may further comprise an accelerator. The accelerator may be latent, blocked, and/or encapsulated. As used herein, the term "latent accelerator" or "blocked accelerator" or "encapsulated accelerator" means a molecule or a compound that is activated by an external energy source prior to reacting or having a catalytic effect. For example, the latent accelerator may be in the form of a solid at room temperature and have no catalytic effect until it is heated and melts or dissolves in the composition, or the latent accelerator may be reversibly reacted with a second compound that prevents any catalytic effect until the reversible reaction is reversed by the application of heat and the second compound is removed, freeing the accelerator to react or catalyze reactions.

Useful accelerators may comprise amidoamine or polyamide catalysts, such as, for example, one of the Ancamide® products available from Air Products, amine, dihydrazide, or dicyandiamide adducts and complexes, such as, for example, one of the Ajicure® products available from Ajinomoto Fine Techno Company, 3,4-dichlorophenyl-N,N-dimethylurea (A.K.A. Diuron) available from Alz Chem, or combinations thereof.

In examples, when utilized, the accelerator may be present in the adhesive composition in an amount of at least 0.01% by weight based on the total composition weight, such as at least 0.5%, such as at least 5%, and in some cases may be present in the adhesive composition in an amount of no more than 10% by weight based on the total adhesive composition weight, such as no more than 5%, such as no more than 1%. In examples, when utilized, the accelerator may be present in the adhesive composition in an amount from 0.01% to 10% by weight based on the total composition weight, such as from 0.5% to 5%.

Reinforcement fillers may optionally be added to the coating composition. Useful reinforcement fillers that may be introduced to the coating composition to provide improved mechanical properties such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength.

Organic and/or inorganic fillers, such as those that are substantially spherical, may optionally be added to the coating composition. Useful organic fillers that may be introduced include cellulose, starch, and acrylic. Useful inorganic fillers that may be introduced include borosilicate, aluminosilicate, and calcium carbonate. The organic and inorganic fillers may be solid, hollow, or layered in composition and may range in size from 10 nm to 1 mm in at least one dimension.

Optionally, additional fillers, thixotropes, colorants, tints and/or other materials also may be added to the coating composition.

Useful thixotropes that may be used include untreated fumed silica and treated fumed silica, castor wax, clay, organo clay and combinations thereof. In addition, fibers such as synthetic fibers like Aramid fiber and Kevlar fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Optionally, such fillers, if present at all, may be present in an amount of at least 0.1% by weight based on total weight of the adhesive composition, such as no more than 0.5% by weight, such as no more than 1% by weight, such as no more than 5% by weight, and may be present in an amount of no more than 30% by weight based on total weight of the composition, such as no more than 20% by weight, such as no more than 15% by weight, such as no more than 10% by weight. Optionally, such fillers, if present at all, may be present in an amount of 0.1% by weight to 30% by weight based on total weight of the adhesive composition, such as 0.1% by weight to 20% by weight, such as 1% by weight to 15% by weight, such as 5% by weight to 10% by weight.

Optionally, the composition may be substantially free, or essentially free, or completely free, of platy fillers such as mica, talc, pyrophyllite, chlorite, vermiculite, or combinations thereof.

Optionally, the composition may be substantially free, or essentially free, or completely free, of free radical initiators.

The coating composition can be applied to the surface of a substrate in any number of different ways, non-limiting examples of which include brushes, rollers, films, pellets, pressure injectors, spray guns and applicator guns. Optionally, the substrate may be 100% water break free. Optionally, the substrate may be non-water break free. As used herein, "water break free" means that water spreads evenly over the surface and does not bead up. As used herein, "non-water break free" means that water beads up over the surface.

In examples, the epoxy-containing component and the curing agent of the coating composition may be mixed just prior to application. The curing between the epoxy-containing component and the curing agent to form a crosslinked final product occurs upon mixing at ambient or slightly thermal temperatures, without the need for an external energy source such as an oven or actinic radiation source. In examples, upon mixing, the adhesive composition may be at least partially cured at ambient conditions or slightly thermal conditions within 168 hr, such as within 48 hr, such as with 24 hr, such as within 1 hr, such as within 0.5 hr, such as within 0.1 hr or less.

After application to the substrate, the coating composition optionally can be cured to form a coating, layer or film, such as using an external energy source such as an oven or other thermal means or through the use of actinic radiation. For example, the composition can be cured by baking and/or curing at elevated temperature, such as at a temperature of at least 80° C., such as at least 100° C., such as at least 120° C., such as at least 125° C., such as at least 130° C., and in some cases at a temperature of no more than 250° C., such as no more than 210° C., such as no more than 185° C., such as no more than 170° C., such as no more than 165° C., and in some cases at a temperature of from 80° C. to 250° C., from 120° C. to 185° C., from 125° C. to 170° C., from 130° C. to 165° C., and for any desired time period (e.g., from 5 minutes to 5 hours) sufficient to at least partially cure the coating composition on the substrate(s). The skilled person understands, however, that the time of curing varies with temperature. The coating, layer or film, may be, for example, an adhesive or a structural adhesive, as described above.

The coating composition may comprise a thermosetting film-forming resin or a thermoplastic film-forming resin. As used herein, the term "film-forming resin" refers to resins that can form a self-supporting continuous film on at least a horizontal surface of a substrate upon removal of any diluents or carriers present in the composition and/or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others. As used herein, the term "thermosetting" refers to resins that "set" irreversibly upon curing or crosslinking, wherein the polymer chains of the polymeric components are joined together by covalent bonds. This property is usually associated with a crosslinking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. As used herein, the term "thermoplastic" refers to resins that comprise polymeric components that are not joined by covalent bonds and thereby can undergo liquid flow upon heating and are soluble in solvents.

As previously indicated, the coating composition may be an electrodepositable coating composition comprising a water-dispersible, ionic salt group-containing film-forming resin that may be deposited onto the substrate by an electrocoating step wherein the electrodepositable coating composition is deposited onto the metal substrate under the influence of an applied electrical potential, i.e., by electrodeposition. The ionic salt group-containing film-forming polymer may comprise a cationic salt group containing film-forming polymer for use in a cationic electrodepositable coating composition. As used herein, the term "cationic salt group-containing film-forming polymer" refers to polymers that include at least partially neutralized cationic groups, such as sulfonium groups and ammonium groups, that impart a positive charge. The cationic salt group-containing film-forming polymer may comprise active hydrogen functional groups, including, for example, hydroxyl groups, primary or secondary amino groups, and thiol groups. Cationic salt group-containing film-forming polymers that comprise active hydrogen functional groups may be referred to as active hydrogen-containing, cationic salt group-containing film-forming polymers. Examples of polymers that are suitable for use as the cationic salt group-containing film-forming polymer include, but are not limited to, alkyd polymers, acrylics, polyepoxides, polyamides, polyurethanes, polyureas, polyethers, and polyesters, among others. The cationic salt group-containing film-forming polymer may be present in the cationic electrodepositable coating composition in an amount of 40% to 90% by weight, such as 50% to 80% by weight, such as 60% to 75% by weight based on the total weight of the resin solids of the electrodepositable coating composition. As used herein, the "resin solids" include the ionic salt group-containing film-forming polymer, curing agent (as discussed below), and any additional water-dispersible non-pigmented component(s) present in the electrodepositable coating composition.

Alternatively, the ionic salt group containing film-forming polymer may comprise an anionic salt group containing film-forming polymer for use in an anionic electrodepositable coating composition. As used herein, the term "anionic salt group containing film-forming polymer" refers to an anionic polymer comprising at least partially neutralized anionic functional groups, such as carboxylic acid and phosphoric acid groups that impart a negative charge. The anionic salt group-containing film-forming polymer may comprise active hydrogen functional groups. Anionic salt group-containing film-forming polymers that comprise active hydrogen functional groups may be referred to as active hydrogen-containing, anionic salt group-containing film-forming polymers. The anionic salt group-containing film-forming polymer may comprise base-solubilized, carboxylic acid group-containing film-forming polymers such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable anionic electrodepositable resin comprises an alkyd-aminoplast vehicle, i.e., a vehicle containing an alkyd resin and an amine-aldehyde resin. Another suitable anionic electrodepositable resin composition comprises mixed esters of a resinous polyol. Other acid functional polymers may also be used such as phosphatized polyepoxide or phosphatized acrylic polymers. Exemplary phosphatized polyepoxides are disclosed in U.S. Patent Application Publication No. 2009-0045071 at [0004]-[0015] and U.S. patent application Ser. No. 13/232,093 at [0014]-[0040], the cited portions of which being incorporated herein by reference. The anionic salt group-containing film-forming polymer may be present in the anionic electrodepositable coating composition in an amount 50% to 90%, such as 55% to 80%, such as 60% to 75% based on the total weight of the resin solids of the electrodepositable coating composition.

The electrodepositable coating composition may further comprise a curing agent. The curing agent may comprise functional groups that are reactive with the functional groups, such as active hydrogen groups, of the ionic salt group-containing film-forming polymer to effectuate cure of the coating composition to form a coating. Non-limiting examples of suitable curing agents are at least partially blocked polyisocyanates, aminoplast resins and phenoplast resins, such as phenolformaldehyde condensates including allyl ether derivatives thereof. The curing agent may be present in the cationic electrodepositable coating composition in an amount of 10% to 60% by weight, such as 20% to 50% by weight, such as 25% to 40% by weight based on the total weight of the resin solids of the electrodepositable coating composition. Alternatively, the curing agent may be present in the anionic electrodepositable coating composition in an amount of 10% to 50% by weight, such as 20% to 45% by weight, such as 25% to 40% by weight based on the total weight of the resin solids of the electrodepositable coating composition.

The electrodepositable coating composition may further comprise other optional ingredients, such as a pigment composition and, if desired, various additives such as fillers, plasticizers, anti-oxidants, biocides, UV light absorbers and stabilizers, hindered amine light stabilizers, defoamers, fungicides, dispersing aids, flow control agents, surfactants, wetting agents, or combinations thereof.

The electrodepositable coating composition may comprise water and/or one or more organic solvent(s). Water can for example be present in amounts of 40% to 90% by weight, such as 50% to 75% by weight based on total weight of the electrodepositable coating composition. If used, the organic solvents may typically be present in an amount of less than 10% by weight, such as less than 5% by weight based on total weight of the electrodepositable coating composition. The electrodepositable coating composition may in particular be provided in the form of an aqueous dispersion. The total solids content of the electrodepositable coating composition may be from 1% to 50% by weight, such as 5% to 40% by weight, such as 5% to 20% by weight based on the total weight of the electrodepositable coating composition. As used herein, "total solids" refers to the non-volatile content of the electrodepositable coating composition, i.e., materials which will not volatilize when heated to 110° C. for 15 minutes.

The cationic electrodepositable coating composition may be deposited upon an electrically conductive substrate by placing the composition in contact with an electrically conductive cathode and an electrically conductive anode, with the surface to be coated being the cathode. Alternatively, the anionic electrodepositable coating composition may be deposited upon an electrically conductive substrate by placing the composition in contact with an electrically conductive cathode and an electrically conductive anode, with the surface to be coated being the anode. An adherent film of the electrodepositable coating composition is deposited in a substantially continuous manner on the cathode or anode, respectively, when a sufficient voltage is impressed between the electrodes. The applied voltage may be varied and can be, for example, as low as one volt to as high as several thousand volts, such as between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film.

Once the cationic or anionic electrodepositable coating composition is electrodeposited over at least a portion of the electroconductive substrate, the coated substrate may be heated to a temperature and for a time sufficient to cure the electrodeposited coating on the substrate. For cationic electrodeposition, the coated substrate may be heated to a temperature ranging from 230° F. to 450° F. (110° C. to 232.2° C.), such as from 275° F. to 400° F. (135° C. to 204.4° C.), such as from 300° F. to 360° F. (149° C. to 180° C.). For anionic electrodeposition, the coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.), such as 200° F. to 210.2° F. (93° C. to 99° C.). The curing time may be dependent upon the curing temperature as well as other variables, for example, the film thickness of the electrodeposited coating, level and type of accelerator present in the composition and the like. For example, the curing time can range from 10 minutes to 60 minutes, such as 20 to 40 minutes. The thickness of the resultant cured electrodeposited coating may range from 10 to 50 microns.

Alternatively, as mentioned above, the systems and methods of the present invention may comprise a coating composition comprising a powder coating composition. The powder coating composition may be deposited onto at least a portion of substrate surface that has been treated with at least one of the cleaning compositions, deoxidizing compositions, and/or seal compositions of the present invention, described above. As used herein, "powder coating composition" refers to a coating composition in the form of a co-reactable solid in particulate form which is substantially or completely free of water and/or solvent. Accordingly, the powder coating composition disclosed herein is not synonymous to waterborne and/or solvent-borne coating compositions known in the art. The powder coating composition may comprise (a) a film forming polymer having a reactive functional group; and (b) a curing agent having a functional group that is reactive with the functional group of the film-forming polymer. Examples of powder coating compositions that may be used in the present invention include the polyester-based ENVIROCRON line of powder coating compositions (commercially available from PPG Industries, Inc.) or epoxy-polyester hybrid powder coating compositions. Alternative examples of powder coating compositions that may be used in the present invention include thermosetting powder coating compositions comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,470,752, assigned to PPG Industries, Inc. and incorporated herein by reference); curable powder coating compositions generally comprising (a) at least one tertiary aminourea compound, at least one tertiary aminourethane compound, or mixtures thereof, and (b) at least one film-forming epoxy-containing resin and/or at least one siloxane-containing resin (such as those described in U.S. Pat. No. 7,432,333, assigned to PPG Industries, Inc. and incorporated herein by reference); and those comprising a solid particulate mixture of a reactive group-containing polymer having a Tg of at least 30° C. (such as those described in U.S. Pat. No. 6,797,387, assigned to PPG Industries, Inc. and incorporated herein by reference). The powder coating compositions are often applied by spraying, electrostatic spraying, or by the use of a fluidized bed. Other standard methods for coating application of the powder coating also can be employed such as brushing, dipping or flowing. After application of the powder coating composition, the coating is often heated to cure the deposited composition. The heating or curing operation is often carried out at a temperature in the range of from 130° C. to 220° C., such as from 170° C. to 190° C., for a period of time ranging from 10 minutes to 30 minutes, such 15 minutes to 25 minutes. According to the invention, the thickness of the resultant film is from 50 microns to 125 microns.

In other examples, as mentioned above, the systems and methods of the present invention may comprise a coating composition comprising a liquid coating composition. The liquid coating composition may be deposited onto at least a portion of substrate surface that has been treated with at least one of the cleaning compositions, deoxidizing compositions, and/or seal compositions of the present invention, described above. As used herein, "liquid coating composition" refers to a coating composition which contains a portion of water and/or solvent that may be substantially or completely removed from the composition upon drying and/or curing. Accordingly, the liquid coating composition disclosed herein is synonymous to waterborne and/or solvent-borne coating compositions known in the art.

The liquid coating composition may comprise, for example, (a) a film forming polymer having a reactive functional group; and (b) a curing agent having a functional group that is reactive with the functional group of the film-forming polymer. In other examples, the liquid coating may contain a film forming polymer that may react with oxygen in the air or coalesce into a film with the evaporation of water and/or solvents. These film-forming mechanisms may require or be accelerated by the application of heat or some type of radiation such as Ultraviolet or Infrared. Examples of liquid coating compositions that may be used in the present invention include the SPECTRACRON® line of solvent-based coating compositions, the AQUACRON® line of water-based coating compositions, and the RAYCRON® line of UV cured coatings (all commercially available from PPG Industries, Inc.). Suitable film forming polymers that may be used in the liquid coating composition of the present invention may comprise a (poly)ester, an alkyd, a (poly)urethane, an isocyanurate, a (poly)urea, a (poly)epoxy, an anhydride, an acrylic, a (poly)ether, a (poly) sulfide, a (poly)amine, a (poly)amide, (poly)vinyl chloride, (poly)olefin, (poly)vinylidene fluoride, (poly)siloxane, or combinations thereof.

Alternatively, as mentioned above, the systems and methods of the present invention may comprise a coating composition comprising a primer coating composition. The primer coating composition may be deposited onto at least a portion of substrate surface that has been treated with at least one of the cleaning compositions, deoxidizing compositions, and/or seal compositions of the present invention, described above.

Alternatively, as mentioned above, the systems and methods of the present invention may comprise a coating composition comprising a topcoat coating composition. The topcoat coating composition may be deposited onto at least a portion of substrate surface that has been treated with at least one of the cleaning compositions, deoxidizing compositions, and/or seal compositions of the present invention, described above.

As mentioned above, the film-forming resin may, in examples, be a primer composition and/or a topcoat composition. The primer and/or topcoat compositions may be, for examples, chromate-based primers and/or advanced performance topcoats. The primer coat can be a conventional chromate-based primer coat, such as those available from PPG Industries, Inc. (product code 44GN072), or a chrome-free primer such as those available from PPG (DESOPRIME CA7502, DESOPRIME CA7521, Deft 02GN083, Deft 02GN084). Alternately, the primer coat can be a chromate-free primer coat, such as the coating compositions described in U.S. patent application Ser. No. 10/758,973, entitled "Corrosion Resistant Coatings Containing Carbon", and U.S. patent application Ser. Nos. 10/758,972, and 10/758, 972, both entitled "Corrosion Resistant Coatings", all of which are incorporated herein by reference, and other chrome-free primers that are known in the art, and which can pass the military requirement of MIL-PRF-85582 Class N or MIL-PRF-23377 Class N may also be used with the current invention.

As mentioned above, the substrate of the present invention also may comprise a topcoat. As used herein, the term "topcoat" refers to a mixture of binder(s) which can be an organic or inorganic based polymer or a blend of polymers, typically at least one pigment, can optionally contain at least one solvent or mixture of solvents, and can optionally contain at least one curing agent. A topcoat is typically the coating layer in a single or multi-layer coating system whose outer surface is exposed to the atmosphere or environment, and its inner surface is in contact with another coating layer or polymeric substrate. Examples of suitable topcoats include those conforming to MIL-PRF-85285D, such as those available from PPG (Deft 03W127A and Deft 03GY292). The topcoat may be an advanced performance topcoat, such as those available from PPG (Defthane® ELT™ 99GY001 and 99W009). However, other topcoats and advanced performance topcoats can be used in the present invention as will be understood by those of skill in the art with reference to this disclosure.

The metal substrate also may comprise a self-priming topcoat, or an enhanced self-priming topcoat. The term "self-priming topcoat", also referred to as a "direct to substrate" or "direct to metal" coating, refers to a mixture of a binder(s), which can be an organic or inorganic based polymer or blend of polymers, typically at least one pigment, can optionally contain at least one solvent or mixture of solvents, and can optionally contain at least one curing agent. The term "enhanced self-priming topcoat", also referred to as an "enhanced direct to substrate coating" refers to a mixture of functionalized fluorinated binders, such as a fluoroethylene-alkyl vinyl ether in whole or in part with other binder(s), which can be an organic or inorganic based polymer or blend of polymers, typically at least one pigment, can optionally contain at least one solvent or mixture of solvents, and can optionally contain at least one curing agent. Examples of self-priming topcoats include those that conform to TT-P-2756A. Examples of self-priming topcoats include those available from PPG (03W169 and 03GY369), and examples of enhanced self-priming topcoats include Defthane® ELT™/ESPT and product code number 97GY121, available from PPG. However, other self-priming topcoats and enhanced self-priming topcoats can be used in the coating system as will be understood by those of skill in the art with reference to this disclosure.

The self-priming topcoat and enhanced self-priming topcoat may be applied directly to the deoxidized substrate. The self-priming topcoat and enhanced self-priming topcoat can optionally be applied to an organic or inorganic polymeric coating, such as a primer or paint film. The self-priming topcoat layer and enhanced self-priming topcoat is typically the coating layer in a single or multi-layer coating system where the outer surface of the coating is exposed to the atmosphere or environment, and the inner surface of the coating is typically in contact with the substrate or optional polymer coating or primer.

The topcoat, self-priming topcoat, and enhanced self-priming topcoat can be applied to the deoxidized substrate, in either a wet or "not fully cured" condition that dries or cures over time, that is, solvent evaporates and/or there is a chemical reaction. The coatings can dry or cure either naturally or by accelerated means for example, an ultraviolet light cured system to form a film or "cured" paint.

In addition, a colorant and, if desired, various additives such as surfactants, wetting agents or accelerators can be included in the coating composition (electrodepositable, powder, or liquid). As used herein, the term "colorant" means any substance that imparts color and/or other opacity and/or other visual effect to the composition. Example colorants include pigments, dyes and tints, such as those used in the paint industry and/or listed in the Dry Color Manufacturers Association (DCMA), as well as special effect compositions. In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

Disclosed herein are systems for treating a variety of substrates. The system may comprise, or consist essentially of, or consist of: a cleaner composition; and/or a deoxidizing composition; and/or a seal composition; and a coating composition. The cleaner composition, deoxidizing composition, and/or seal composition may comprise, or consist essentially of, or consist of, a homopolymer or copolymer comprising, or consisting essentially of, or consisting of, a phosphorous-containing monomeric subunit m1 as described above. The deoxidizing composition may comprise, or consist essentially of, or consist of, a Group IVA metal and/or a Group IVB metal and free fluoride and may have a pH of 1.0 to 3.0. The coating composition may be any of the coating compositions described above, such as a resinous coating composition, such as an adhesive composition, a structural adhesive composition, a thermoplastic film-forming resin, a thermosetting film-forming resin, an electrocoat coating composition, a liquid coating composition, a powder coating composition, a primer coating composition, a topcoat coating composition, or combinations thereof. The coating composition may be a one-component coating composition or a two-component coating composition.

A system of the present invention may comprise, or consist essentially of, or consist of, a cleaner composition and a coating composition. The cleaner composition may comprise, or consist essentially of, or consist of, a homopolymer or copolymer comprising, or consisting essentially of, or consisting of, a phosphorous-containing monomeric subunit m1 as described above.

A system of the present invention may comprise, or consist essentially of, or consist of, a deoxidizing composition and a coating composition. The deoxidizing composition may comprise, or consist essentially of, or consist of, a Group IVA metal and/or a Group IVB metal and free fluoride, wherein the deoxidizing composition has a pH of 1.0 to 3.0 and optionally may further comprise, or consist essentially of, or consist of, a homopolymer or copolymer comprising, or consisting essentially of, or consisting of, a phosphorous-containing monomeric subunit m1 as described above. The system optionally may further comprise, or consist essentially of, or consist of, a cleaner composition and/or a seal composition.

A system of the present invention may comprise, or consist essentially of, or consist of, a seal composition and a coating composition. The seal composition may comprise, or consist essentially of, or consist of, a homopolymer or copolymer comprising, or consisting essentially of, or consisting of, a phosphorous-containing monomeric subunit m1 as described above. The system optionally may further comprise, or consist essentially of, or consist of, a deoxidizing composition comprising, or consisting essentially of, or consisting of, a Group IVA metal and/or a Group IVB metal and free fluoride, wherein the deoxidizing composition has a pH of 1.0 to 3.0, and/or a cleaner composition.

Any of the systems disclosed herein may comprise a cleaner composition. At least a portion of the substrate surface may be cleaned prior to contacting at least a portion of the substrate surface with the deoxidizing composition described above, in order to remove grease, dirt, and/or other extraneous matter. At least a portion of the surface of the substrate may be cleaned by physical and/or chemical means, such as mechanically abrading the surface and/or cleaning/degreasing the surface with commercially available alkaline or acidic cleaning agents that are well known to those skilled in the art. Examples of alkaline cleaners suitable for use in the present invention include Chemkleen™ 166HP, 166M/C, 177, 490MX, 2010LP, and Surface Prep 1 (SP1), Ultrax 32, Ultrax 97, Ultrax 29, Ultrax92D, Ultrax 14, and Ultrax 45, each of which are commercially available from PPG Industries, Inc. (Cleveland, OH), and any of the DFM Series, RECC 1001, and 88X1002 cleaners (commercially available from PRC-DeSoto International, Sylmar, CA), and Turco 4215-NCLT and Ridolene (commercially available from Henkel Technologies, Madison Heights, MI). Examples of acidic cleaners suitable for use in the present invention include Acid Metal Cleaner (AMC) 23, AMC 239, AMC 240, and AMC 533. Such cleaners are often preceded and/or followed by a water rinse, such as with tap water, distilled water, or combinations thereof. In other examples, the cleaner may comprise the homopolymer or copolymer described herein.

Disclosed herein are methods for treating a variety of substrates. The method may comprise, or consist essentially of, or consist of: contacting a surface of the substrate with a cleaner composition; and/or contacting the substrate surface with a deoxidizing composition; and/or contacting the substrate surface with a seal composition; and contacting the substrate surface with a coating composition. The cleaner composition, deoxidizing composition, and/or seal composition may comprise, or consist essentially of, or consist of, a homopolymer or copolymer comprising, or consisting essentially of, or consisting of, a phosphorous-containing monomeric subunit m1 as described above. The deoxidizing composition may comprise, or consist essentially of, or consist of, a Group IVA metal and/or a Group IVB metal and free fluoride, wherein the deoxidizing composition has a pH of 1.0 to 3.0. The coating composition may be any of the coating compositions described above, such as a resinous coating composition, such as an adhesive composition, a structural adhesive composition, a thermoplastic film-forming resin, a thermosetting film-forming resin, an electrocoat coating composition, a liquid coating composition, a powder coating composition, a primer coating composition, a topcoat coating composition, or combinations thereof. The coating composition may be a one-component coating composition or a two-component coating composition. Any suitable technique may be used to deposit such a coating composition onto the substrate, including, for example, brushing, dipping, flow coating, spraying and the like. Optionally, however, as described in more detail below, such depositing of a coating composition may comprise an electrocoating step wherein an electrodepositable coating composition is deposited onto a metal substrate by electrodeposition. In certain other instances, as described in more detail below, such depositing of a coating composition comprises a powder coating step. In still other instances, the coating composition may be a liquid coating composition.

A method of treating substrate of the present invention may comprise, or consist essentially of, or consist of, contacting a surface of the substrate with a cleaner composition and contacting the surface with a coating composition. The cleaner composition may comprise, or consist essentially of, or consist of, a homopolymer or copolymer comprising, or consisting essentially of, or consisting of, a phosphorous-containing monomeric subunit m1 as described above.

A method of treating substrate of the present invention may comprise, or consist essentially of, or consist of, contacting a surface of the substrate with a deoxidizing composition and contacting the surface with a coating composition. The deoxidizing composition may comprise, or consist essentially of, or consist of, a Group IVA metal and/or a Group IVB metal and free fluoride, wherein the deoxidizing composition has a pH of 1.0 to 3.0 and optionally may further comprise, or consist essentially of, or consist of, a homopolymer or copolymer comprising, or consisting essentially of, or consisting of, a phosphorous-containing monomeric subunit m1 as described above. The method optionally may further comprise, or consist essentially of, or consist of, contacting the substrate surface with a cleaner composition and/or a seal composition.

A method of treating substrate of the present invention may comprise, or consist essentially of, or consist of, contacting a surface of the substrate with a seal composition and contacting the substrate surface with a coating composition. The seal composition may comprise, or consist essentially of, or consist of, a homopolymer or copolymer comprising, or consisting essentially of, or consisting of, a phosphorous-containing monomeric subunit m1 as described above. The method optionally may further comprise, or consist essentially of, or consist of, contacting the substrate surface with a deoxidizing composition comprising, or consisting essentially of, or consisting of, a Group IVA metal and/or a Group IVB metal and free fluoride, wherein the deoxidizing composition has a pH of 1.0 to 3.0, and/or contacting the substrate surface with a cleaner composition.

Following the cleaning step(s), the substrate optionally may be rinsed with tap water, deionized water, and/or an aqueous solution of rinsing agents in order to remove any residue. The wet substrate surface optionally may be treated with a deoxidizing composition and/or a sealing composition (described above) or with one of the coating compositions described below, or the substrate may be dried prior to treating the substrate surface, such as air dried, for example, by using an air knife, by flashing off the water by brief exposure of the substrate to, for example, 15° C. to 100° C., such as 20° C. to 90° C., or in a heater assembly using, for example, infrared heat, such as for 10 minutes at 70° C., or by passing the substrate between squeegee rolls.

According to the methods of the present invention, the solution or dispersion of the deoxidizing composition may be brought into contact with the substrate by any of a variety of known techniques, such as dipping or immersion, spraying, intermittent spraying, dipping followed by spraying, spraying followed by dipping, brushing, or roll-coating. The deoxidizing composition, when applied to the metal substrate, may be at a temperature ranging from 4° C. to 85° C., such as 15.5° C. to 43.3° C., such as 21° C. to 32.2° C. For example, the deoxidation process may be carried out at ambient or room temperature. The contact time may be 5 seconds to 15 minutes, such as 10 seconds to 10 minutes, such as 15 seconds to 3 minutes.

Following the contacting with a deoxidizing composition disclosed herein, the substrate optionally may be air dried at room temperature or may be dried with hot air, for example, by using an air knife, by flashing off the water by brief exposure of the substrate to a high temperature, such as by drying the substrate in an oven at 15° C. to 200° C. or in a heater assembly using, for example, infrared heat, such as for 10 minutes at 70° C., or by passing the substrate between squeegee rolls. Following the contacting with a deoxidizing composition, the substrate optionally may be rinsed with tap water, deionized water, and/or an aqueous solution of rinsing agents in order to remove any residue and then optionally may be dried, for example air dried or dried with hot air as described in the preceding sentence, such as by drying the substrate in an oven at 15° C. to 100° C., such as 20° C. to 90° C., or in a heater assembly using, for example, infrared heat, such as for 10 minutes at 70° C., or by passing the substrate between squeegee rolls. Following the contacting with a deoxidizing composition, and any optional rinsing stages, a seal composition and/or a coating composition (described below) may be deposited onto at least a portion of the surface of the substrate by any suitable technique, including, for example, brushing, dipping, flow coating, spraying and the like.

According to the methods of the present invention, the seal composition may be brought into contact with a surface of a substrate by any of a variety of known techniques, such as dipping or immersion, spraying, intermittent spraying, dipping followed by spraying, spraying followed by dipping, brushing, or roll-coating. The seal composition, when applied to the metal substrate, may be at a temperature ranging from 15° C. to 85° C., such as 20° C. to 60° C., for example, at ambient or room temperature. The contact time is often from 5 seconds to 5 minutes, such as 15 seconds to 4 minutes, such as 30 seconds to 3 minutes.

Following the contacting with the seal composition, the substrate optionally may be air dried at room temperature or may be dried with hot air, for example, by using an air knife, by flashing off the water by brief exposure of the substrate to a high temperature, such as by drying the substrate in an oven at 15° C. to 200° C. or in a heater assembly using, for example, infrared heat, such as for 10 minutes at 70° C., or by passing the substrate between squeegee rolls. Following the contacting with the seal composition, the substrate optionally may be rinsed with tap water, deionized water, and/or an aqueous solution of rinsing agents in order to remove any residue and then optionally may be dried, for example air dried or dried with hot air as described in the preceding sentence, such as by drying the substrate in an oven at 15° C. to 100° C., such as 20° C. to 90° C., or in a heater assembly using, for example, infrared heat, such as for 10 minutes at 70° C., or by passing the substrate between squeegee rolls. Following the contacting with the seal composition, and any optional rinsing stages, a coating composition comprising a film-forming resin may be deposited onto at least a portion of the surface of the substrate by any suitable technique, including, for example, brushing, dipping, flow coating, spraying and the like.

In an example, a bond may be formed between two substrates for a wide variety of potential applications in which the bond between the substrates provides particular mechanical properties related to both lap shear strength and displacement. A method of forming a bond may comprise, or consist essentially of, or consist of, contacting at least a portion of a surface of the substrate with a cleaning composition described herein, a deoxidizing composition described herein and/or a seal composition described herein, and contacting at least a portion of the substrate surface with an adhesive composition described above to a first substrate; contacting a second substrate to the adhesive composition such that the composition is located between the first substrate and the second substrate; and curing the composition, as described herein. For example, the composition may be applied to either one or both of the substrate materials being bonded to form an adhesive bond therebetween and the substrates may be aligned and pressure and/or spacers may be added to control bond thickness. The composition may be applied to cleaned or uncleaned (i.e., including oily or oiled) substrate surfaces.

As stated above, the composition of the present disclosure also may form a coating, such as a sealant, on a substrate or a substrate surface. The coating composition may be applied to substrate surfaces, including, by way of non-limiting example, a vehicle body or components of an automobile frame or an airplane, or to armor assemblies such as those on a tank, or to protective clothing such as body armor, personal armor, suits of armor, and the like. The sealant formed by the composition of the present invention provides sufficient lap shear strength and displacement. The composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. An external energy source may subsequently be applied to cure the coating composition, such as baking in an oven.

As described above, substrates treated according to the systems and methods of the present invention may have a film, coating, or the like formed by a coating composition, such as a resinous composition, applied to at least a portion of the substrate surface. In examples, the coating composition may have a dry film thickness of at least 2.5 micrometers, such as at least 5 micrometers, such as at least 20 micrometers, and in some instances may have a dry film thickness of no more than 1270 micrometers, such as no more than 1100 micrometers, such as no more than 800 micrometers. In examples, the coating composition may have a dry film thickness of 2.5 micrometers to 1270 micrometers, such as 5 micrometers to 1100 micrometers, such as 20 micrometers to 800 micrometers. In other examples, the coating composition may have a dry film thickness of at least 5 micrometers, such as at least 10 micrometers, such as at least 15 micrometers, and in some instances may have a dry film thickness of no more than 75 micrometers, such as no more than 50 micrometers, such as no more than 30 micrometers. In examples, the coating composition may have a dry film thickness of 5 micrometers to 75 micrometers, such as 10 micrometers to 50 micrometers, such as 15 micrometers to 30 micrometers.

The substrates that may be coated by the compositions disclosed herein are not limited. Suitable substrates useful in the present invention include, but are not limited to, materials such as metals or metal alloys, ceramic materials such as boron carbide or silicon carbide, polymeric materials such as hard plastics including filled and unfilled thermoplastic materials or thermoset materials, woven or non-woven fibrous sheets or grids, or composite materials. Other suitable substrates useful in the present invention include, but are not limited to, glass or natural materials such as wood. For example, suitable substrates include rigid metal substrates such as ferrous metals, aluminum, aluminum alloys, magnesium titanium, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 1XXX, 2XXX, 3XXX, 4XXX, 5XXX, 6XXX, 7XXX, or 8XXX series as well as clad aluminum alloys and cast aluminum alloys of the A356, 1XX.X, 2XX.X, 3XX.X, 4XX.X, 5XX.X, 6XX.X, 7XX.X, or 8XX.X series also may be used as the substrate. Magnesium alloys of the AZ31B, AZ91C, AM60B, or EV31A series also may be used as the substrate. The substrate used in the present invention may also comprise titanium and/or titanium alloys of grades 1-36 including H grade variants. Other suitable non-ferrous metals include copper and magnesium, as well as alloys of these materials. Suitable metal substrates for use in the present invention include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. The substrate may comprise a fibrous material, a sheet, or a mesh, including comprising carbon fibers, glass fibers, and/or nylon. The substrate may comprise a composite material such as a plastic or a fiberglass composite. The substrate may be a fiberglass and/or carbon fiber composite. The compositions disclosed herein are particularly suitable for use in various industrial or transportation applications including automotive, light and heavy commercial vehicles, marine, or aerospace.

The systems and methods of the present invention may also be used to treat substrate including food and/or beverage packaging, components used to fabricate such packaging or monobloc aerosol cans and/or tubes. Suitably, the food and/or beverage packaging may be a can. Examples of cans include, but are not limited to one or more of the following, two-piece cans, three-piece cans and the like. Suitable examples of monobloc aerosol cans and/or tubes include, but are not limited to, deodorant and hair spray containers. Monobloc aerosol cans and/or tubes may be aluminum monobloc aerosol cans and/or tubes. Suitably, the coating compositions may be applied to food and/or beverage packaging or components used to fabricate such packaging.

Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coating compositions of the disclosed herein are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure: after formation. Coatings for cans subjected to relatively stringent temperature and/or pressure requirements should also be resistant to popping, corrosion, blushing and/or blistering.

Accordingly, the present invention is further directed to a food and/or beverage package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents tree from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only, maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food and/or beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products.

Any coating composition suitable for use as a coating on one of the substrates described in the previous paragraph may be used as the coating of the systems and methods described herein. The coating composition disclosed herein may be cured by any suitable method. The coating composition may be cured by heat curing or by chemical curing, suitably by heat curing. The coating composition, when heat cured, may be cured at any suitable temperature. The coating composition, when heat cured, may be cured at temperatures from 50 to 350° C., suitably from 100 to 320° C., such as from 150 to 300° C., or even from 200 to 300° C. Suitably, the coating composition, when heat cured, may be cured at 200° C. or at 280° C. Suitably, the coating composition, when heat cured, may be cured to a peak metal temperature (PMT) of 230° C. to 250° C. For the avoidance of doubt, the term "peak metal temperature", and like terms as used herein, is meant unless specified otherwise the maximum temperature reached by the metal substrate during exposure to a heat during the heat curing process. In other words, the peak metal temperature (PMT) is the maximum temperature reached by the metal substrate and not the temperature which is applied thereto. It will be appreciated by a person skilled in the art that the temperature reached by the metal substrate may be lower than the temperature which is applied thereto or may be substantially equal to the temperature which is applied thereto. Suitably, the temperature reached by the metal substrate may be lower that the temperature which is applied thereto. Curing the coating compositions suitably forms a cured film.

The beverage can comprises a can body and a can end. Examples of beverage cans include, but are not limited to one or more of the following, two-piece cans, three-piece cans and the like.

The beverage can may be formed from any suitable material. Suitably, the beverage can may be formed from metal. Suitable metals will be well known to a person skilled in the art. Suitable examples include, but are not limited to, the following: steel; tinplate; tinplate pre-treated with a protective material such as chromium, titanium, titanate or aluminum; tin-free steel (TFS); galvanised steel, such as for example electro-galvanised steel; aluminum; aluminum alloy; and combinations thereof. It will be appreciated by a person skilled in the art that the can body and can end of the beverage can may be formed from the same or different materials, such as the same or different metals. Suitably, the can body and can end of the beverage can may be formed from the same material, such as the same metal.

The can body and/or can end may be made from coiled metal stock. Suitably, at least the can end may be formed from coiled metal stock. Suitably, the coating compositions of the present invention may be applied to coiled metal stock, such as the coiled metal stock from which the ends of cans are made ("can end stock").

The coating composition may be applied to the can end stock prior to the can end being cut and stamped out of the coiled metal stock. The can end may be coated on one or both surfaces. As such, the can coil stock may be coated on one or both surfaces prior to the can end being cut and stamped out of the coiled metal stock.

Advantageously, coating the coiled metal stock on both surfaces thereof may provide sufficient lubricity such that the coating is able to survive the stamping operation.

The can ends having a score line thereon may be "easy open" can ends, sometimes referred to as "easy open ends" or even "EOEs".

Suitably, the score line is applied to the can ends after the can ends have punched from the coated metal stock.

The can ends, once formed, are suitably attached to a can body. The can end may be attached to the can body by any suitable method. Suitably, the can end may be attached to the can body by an edge rolling process.

The coating compositions may be applied to at least the internal surface of the can end over a portion of the score line or may be applied over all of the score line.

The coating compositions may be applied to substantially all of or to a portion of the interior surface of the can end, with the proviso that the coating compositions are applied to at least a portion of the interior surface of the can end over at least a portion of the score line. Suitably, the coating compositions may be applied to substantially all of the interior surface of the can end. The coating compositions may be applied to at least a portion of the exterior surface of the can end. The coating compositions may be applied to substantially all of or to a portion of the exterior surface of the can end. Suitably, the coating compositions may be applied to the exterior surface of the can end over at least a portion of the score line. The coating compositions may be applied to at least a portion of the interior and/or exterior surface of the can body.

The coating compositions may be applied to the can end by any suitable method. Methods of applying said coating compositions will be well known to a person skilled in the art. Suitable application methods include, but are not limited to one or more of the following, spray coating, roll coating, dipping and/or electrocoating.

In an example, the coating compositions may be applied to any suitable dry film thickness. In an example, the coating compositions may be applied to a dry film thickness of 1 μm (microns) to 100 μm, suitably 1 μm to 75 μm, such as 1 μm to 50 μm, such as 1 μm to 20 μm, such as 1 μm to 10 μm.

The coating compositions may be applied to the can end as a single layer or as part of a multi layer system. The coating composition may be applied as a single layer. The coating composition may be applied as the first coat of a multi coat system. The coating composition may be applied as an undercoat or a primer. The second, third, fourth etc. coats may comprise any suitable film-forming resin. Suitable examples of film-forming resins include, but are not limited to, the following: polyester resins; acrylic resins; polyvinyl chloride (PVC) resins; alkyd resins; polyurethane resins; polysiloxane resins; epoxy resins; or combinations thereof. The coating composition may be in the form of a liquid or a powder. The coating composition may be solvent-borne or aqueous. The coating compositions may be applied on top of another paint layer as part of a multi-layer system. For example, the coating composition may be applied on top of a primer. The coating compositions may form an intermediate layer or a top coat layer. The coating composition may be applied to a substrate once or multiple times. It will be appreciated by a person skilled in the art that the can body and can end of the beverage can may each independently be coated with a single layer or a multi layer system.

It also has been surprisingly and unexpectedly discovered that treatment of at least a portion of a substrate surface with a system or method of the present invention result in a substrate having formed thereon a coating, film, or the like that has adhesion of greater than 0 MPa measured according to ASTM D1002-10 using 2024-T3 aluminum substrate of 1.6 mm thickness as measured by an INSTRON 5567 machine in tensile mode with a pull rate of 1.3 mm per minute, such as at least 0.1 MPa, such as at least 1.0 MPa, such as at least 10.0 MPa, such as at least 20.0 MPa, while also having a scribe creep at least as good as scribe creep on a substrate treated with zinc phosphate-, hexavalent chromium-, or Group IVB metal-containing pretreatment compositions followed by treatment with one of the coating compositions described herein.

It also has been surprisingly and unexpectedly discovered that treatment of at least a portion of a surface of a metal substrate with one of systems of the present invention (i.e., one of the treatment compositions of the present invention, followed by treatment with one of the coating compositions described herein) eliminates the need for treating the substrate surface with a pretreatment composition, such as zinc phosphate-, hexavalent chromium-, or Group IVB metal-containing pretreatment compositions. It has also been surprisingly and unexpectedly discovered that treatment of at least a portion of a surface of a metal substrate with one of systems of the present invention (i.e., one of the treatment compositions of the present invention, followed by treatment with one of the coating compositions described herein) results in a substrate having flexibility, blush, and cure that is at least as good as substrates treated with zirconium-containing pretreatment compositions followed by treatment with a coating composition.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS OF THE INVENTION

In the following, some non-limiting aspects of the present invention are summarized:

Aspect 1. A deoxidizing composition comprising:

a Group IVA metal and/or a Group IVB metal; and free fluoride;

wherein the composition has a pH of 1.0 to 3.0.

Aspect 2. The deoxidizing composition of Aspect 1, wherein the Group IVA metal is present in the deoxidizing composition in an amount of 10 ppm to 1000 ppm based on total weight of the deoxidizing composition.

Aspect 3. The deoxidizing composition of Aspect 1 or Aspect 2, wherein the Group IVB metal is present in the deoxidizing composition in an amount of 200 ppm to 5000 ppm based on total weight of the deoxidizing composition.

Aspect 4. The deoxidizing composition of any of the preceding Aspects, wherein the free fluoride derives from a compound or complex comprising the Group IVA metal and/or the Group IVB metal.

Aspect 5. The deoxidizing composition of any of the preceding Aspects, wherein the free fluoride derives from a compound or complex other than a compound or complex comprising the Group IVA metal and/or the Group IVB metal.

Aspect 6. The deoxidizing composition of any of the preceding Aspects, wherein the free fluoride is present in the deoxidizing composition in an amount of 2 ppm to 100 ppm based on total weight of the deoxidizing composition.

Aspect 7. The deoxidizing composition of any of the preceding Aspects, further comprising a Group IA metal, a Group VIB metal, an electropositive metal, or combinations thereof.

Aspect 8. The deoxidizing composition of Aspect 7, wherein the Group IA metal is present in the deoxidizing composition in an amount of 2 ppm to 500 ppm based on total weight of the deoxidizing composition.

Aspect 9. The deoxidizing composition of Aspect 7 or Aspect 8, wherein the Group VIB metal is present in the deoxidizing composition in an amount of 5 ppm to 500 ppm based on total weight of the deoxidizing composition.

Aspect 10. The deoxidizing composition of any one of Aspects 7-9 wherein the electropositive metal is present in the deoxidizing composition in an amount of 2 ppm to 100 ppm based on total weight of the deoxidizing composition.

Aspect 11. The deoxidizing composition of any one of the preceding Aspects, wherein the composition is substantially free of chromium, derivatives of chromium, phosphate ions, and/or phosphate-containing compounds.

Aspect 12. The deoxidizing composition of any of the preceding Aspects, further comprising a homopolymer or copolymer comprising a phosphorous-containing monomeric subunit m1 and optionally a non-phosphorous-containing monomeric subunit m2.

Aspect 13. The deoxidizing composition of Aspect 12, wherein the deoxidizing composition comprises a homopolymer.

Aspect 14. The deoxidizing composition of Aspect 12, wherein the copolymer comprises a dipolymer.

Aspect 15. The deoxidizing composition of Aspect 12, wherein the copolymer comprises a terpolymer.

Aspect 16. The deoxidizing composition of any one of Aspects 12 to 15, wherein the monomeric subunit m1 is present in the homopolymer or copolymer in an amount of 5 molar percent 100 molar percent based on total homopolymer or copolymer molarity.

Aspect 17. The deoxidizing composition of any one of Aspects 12 to 16, wherein the monomeric subunit m2 is present in the homopolymer or copolymer in an amount of no more than 95 molar percent based on total homopolymer or copolymer molarity.

Aspect 18. The deoxidizing composition of any one of Aspects 12 to 17, wherein the homopolymer or copolymer is present in the deoxidizing composition in an amount of 100 ppm to 3000 ppm based on total weight of the deoxidizing composition.

Aspect 19. A system for treating a substrate, comprising:

a cleaner composition; and/or a deoxidizing composition of any of the preceding Aspects; and/or a seal composition; and a coating composition.

Aspect 20. The system of Aspect 19, wherein the cleaner composition has a pH of 7.0 or less.

Aspect 21. The system of Aspect 19, wherein the cleaner composition has a pH of greater than 7.0.

Aspect 22. The system of any one of Aspects 19 to 21, wherein the cleaner composition comprises a homopolymer or copolymer comprising a phosphorous-containing monomeric subunit m1 and optionally a non-phosphorous-containing monomeric subunit m2.

Aspect 23. The system of Aspect 22, wherein the homopolymer or copolymer is present in the cleaner composition in an amount of 60 ppm to 3000 ppm based on total weight of the cleaner composition.

Aspect 24. The system of any one of Aspects 19 to 23, wherein the seal composition comprises a homopolymer or copolymer comprising a phosphorous-containing monomeric subunit m1 and optionally a non-phosphorous-containing monomeric subunit m2.

Aspect 25. The system of Aspect 24, wherein the homopolymer or copolymer is present in the seal composition in an amount of 2500 ppm to 100,000 ppm based on total solids content of the seal composition.

Aspect 26. The system of any of Aspects 19 to 25, wherein the seal composition further comprises at least one transition metal.

Aspect 27. The system of Aspect 26, wherein the transition metal is present in the seal composition in an amount of 5 ppm to 500 ppm based on total weight of the seal composition.

Aspect 28. The system of any of Aspects 19 to 27, wherein the seal composition has a pH of 6 or less.

Aspect 29. The system of any of Aspects 19 to 28, wherein at least one of the cleaner composition and the seal composition is substantially free of chromium, derivatives of chromium, phosphate ions, and/or phosphate-containing compounds.

Aspect 30. The system of any one of Aspects 18 to 29, wherein the coating composition comprises a resinous composition.

Aspect 31. The system of Aspect 30, wherein the resinous composition comprises a cationic electrocoat composition or an anionic electrocoat composition.

Aspect 32. The system of Aspect 30, wherein the resinous composition comprises a primer composition.

Aspect 33. The system of Aspect 30, wherein the resinous composition comprises an adhesive composition.

Aspect 34. The system of Aspect 33, wherein the adhesive composition comprises: an epoxy-containing component; and a curing component that reacts with the epoxy-containing component.

Aspect 35. The system of Aspect 34, wherein the curing component is activatable by an external energy source.

Aspect 36. The system of Aspect 34 or 35, wherein the epoxy-containing component comprises bisphenol A polyepoxide, bisphenol F polyepoxide, a novolac resin, or combinations thereof.

Aspect 37. The system of any one of Aspects 34 to 36, wherein the epoxy-containing component is present in an amount of 10% by weight to 90% by weight based on total weight of the adhesive composition.

Aspect 38. The system of any one of Aspects 34 to 37, wherein the epoxy-containing component is present in an amount of 45% by weight to 90% by weight based on total weight of the adhesive composition.

Aspect 39. The system of any one of Aspects 34 to 38, wherein the curing component comprises an amine, an amine-adduct, a thiol, or combinations thereof.

Aspect 40. The system of any one of Aspects 34 to 39, wherein the curing component comprises at least one guanidine having a D90 particle size of 25 μm measured by dynamic light scattering.

Aspect 41. The system of any one of Aspects 34 to 40, wherein the equivalent ratio of curing component to epoxy-containing component is 0.5:1 to 1.5:1.

Aspect 42. The system of any one of Aspects 34 to 41, further comprising elastomeric particles.

Aspect 43. The system of Aspect 42, wherein the elastomeric particles are present in an amount of 0.1% by weight to 11% by weight based on total weight of the adhesive composition.

Aspect 44. The system of Aspect 42, wherein the elastomeric particles are present in an amount of greater than 11% by weight to 25% by weight based on total weight of the composition.

Aspect 45. The system of any of Aspects 19 to 33, wherein the coating composition comprises a one-component coating composition comprising an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering.

Aspect 46. The system of Aspect 45, wherein the epoxy-containing component has an average epoxide functionality of greater than 1.0 and less than 3.2.

Aspect 47. The system of Aspect 45 or 46, wherein at least 50% by weight of the elastomeric particles comprise a styrene butadiene core based on total weight of the elastomeric particles and/or wherein at least 50% of the elastomeric particles have an average particle size of less than 150 nm as measured by transmission electron microscopy and/or wherein no more than 50% by weight of the elastomeric particles comprise a polybutadiene core and/or a polysiloxane core based on total weight of the elastomeric particles.

Aspect 48. The system of any one of Aspects 45 to 47, further comprising an accelerator, wherein the accelerator is latent, encapsulated, non-latent, non-encapsulated, or combinations thereof.

Aspect 49. A substrate treated with the system of any of Aspects 19 to 48.

Aspect 50. The substrate of Aspect 49, comprising a can.

Aspect 51. The substrate of Aspect 49, comprising a vehicle.

Aspect 52. The substrate of Aspect 49, wherein a surface of the substrate is at least partially coated with the coating composition.

Aspect 53. The substrate of any of Aspects 49 to 52, wherein the composition, in an at least partially cured state, has a lap shear strength of at least 30 MPa and a lap shear displacement at failure of at least 15% of the overlap length, both measured according to ASTM D1002-10 using 2024-T3 aluminum substrate of 1.6 mm thickness, as measured by an INSTRON 5567 machine in tensile mode with a pull rate of 1.3 mm per minute.

Aspect 54. The substrate of any of Aspects 49 to 53, wherein the substrate is at least partially embedded in the coating composition.

Aspect 55. The substrate of Aspect 54, wherein the substrate is a fibrous material, a sheet, or a mesh.

Aspect 56. The substrate of Aspect 55, wherein the fibrous material, the sheet, or the mesh comprises carbon fibers, glass fibers, and/or nylon.

Aspect 57. The substrate of any of Aspects 54 to 56, positioned on a second substrate.

Aspect 58. The substrate of Aspect 57, positioned between the second substrate and a third substrate.

Aspect 59. Protective clothing comprising the substrate of any of Aspects 52 to 58.

Aspect 60. An article comprising: a substrate treated with the system of any of Aspects 19 to 48.

Aspect 61. The article of Aspect 60, further comprising a second substrate; wherein the composition is positioned between the first substrate and the second substrate.

Aspect 62. The article of Aspect 61, wherein the first substrate and the second substrate are the same material.

Aspect 63. The article of Aspect 61, wherein the first substrate and the second substrate are different material.

Aspect 64. The article of Aspect 63, wherein the first substrate comprises a ceramic and the second substrate comprises aluminum or a composite.

Aspect 65. A substrate comprising a coating formed from a composition comprising an epoxy-containing component, elastomeric particles in an amount of greater than 11% by weight to 25% by weight based on total weight of the composition, and a curing component activatable by an external energy source, the curing component comprising at least one guanidine having a D90 particle size of 25 μm measured by dynamic light scattering.

Aspect 66. The substrate of Aspect 65, wherein the epoxy-containing component has an average epoxide functionality of greater than 1.0 and less than 3.2.

Aspect 67. The substrate of Aspect 65 or Aspect 66, wherein at least 50% by weight of the elastomeric particles comprise a styrene butadiene core based on total weight of the elastomeric particles and/or wherein at least 50% of the elastomeric particles have an average particle size of less than 150 nm as measured by transmission electron microscopy and/or wherein no more than 50% by weight of the elastomeric particles comprise a polybutadiene core and/or a polysiloxane core based on total weight of the elastomeric particles.

Aspect 68. The substrate of any of Aspects 65 to 67, wherein the composition, in an at least partially cured state, has a lap shear strength of at least 30 MPa and a lap shear displacement at failure of at least 15% of the overlap length, both measured according to ASTM D1002-10 using 2024-T3 aluminum substrate of 1.6 mm thickness, as measured by an INSTRON 5567 machine in tensile mode with a pull rate of 1.3 mm per minute.

Aspect 69. The substrate of any of Aspects 65 to 68, wherein the substrate is at least partially embedded in the coating composition.

Aspect 70. The substrate of Aspect 69, wherein the substrate is a fibrous material, a sheet, or a mesh.

Aspect 71. The substrate of Aspect 70, wherein the fibrous material, the sheet, or the mesh comprises carbon fibers, glass fibers, and/or nylon.

Aspect 72. The substrate of any of Aspects 65 to 71, positioned on a second substrate.

Aspect 73. The substrate of Aspect 72, positioned between the second substrate and a third substrate.

Aspect 74. Protective clothing comprising the substrate of any of Aspects 65 to 73.

Aspect 75. An article comprising: the substrate of any of Aspects 65 to 73.

Aspect 76. The article of Aspect 75, further comprising a second substrate; wherein the composition is positioned between the substrate and the second substrate.

Aspect 77. The article of Aspect 76, wherein the substrate and the second substrate are the same material.

Aspect 78. The article of Aspect 76, wherein the substrate and the second substrate are different material.

Aspect 79. The article of Aspect 78, wherein the substrate comprises a ceramic and the second substrate comprises aluminum or a composite.

Aspect 80. A method for treating a substrate, comprising: treating the substrate with the system of any of Aspects 19 to 48.

Aspect 81. The method of Aspect 80, further comprising treating the substrate with a composition comprising wax.

Aspect 82. A method for treating a substrate, comprising: contacting at least a portion of a surface of the substrate with the deoxidizing composition of any one of Aspects 1 to 18; and contacting at least a portion of the surface with a coating composition.

Aspect 83. The method of Aspect 82, further comprising contacting at least a portion of the substrate with a cleaning composition.

Aspect 84. The method of Aspect 82 or 83, further comprising contacting at least a portion of the substrate with a seal composition comprising a homopolymer or copolymer comprising a phosphorous-containing monomeric subunit m1 and optionally a non-phosphorous-containing monomeric subunit m2.

Aspect 85. The method of any one of Aspects 82 to 84, further comprising treating at least a portion of the substrate with a composition comprising wax prior to treating the composition with the coating composition.

Aspect 86. The method of any one of Aspects 82 to 85, wherein the substrate is not contacted with a pretreatment composition following the contacting with the deoxidizing composition and prior to the contacting with the coating composition.

Aspect 87. A substrate treated with the method according to any one of Aspects 80 to 86.

Aspect 88. Use of the deoxidizing composition according to any one of Aspects 1 to 18 for deoxidizing a substrate prior to depositing a coating composition onto said substrate.

Aspect 89. The use according to Aspect 88, wherein the coating composition is a coating composition as described in any one of Aspects 30 to 48 and/or the substrate is coated by a method for treating a substrate as described in any one of Aspects 80 to 86.

EXAMPLES

Preparation of Compositions Used in Examples 1-8

Preparation of Cleaner Composition Bath I (C-I): A rectangular stainless-steel tank with a total volume of 37 gallons, equipped with spray nozzles, was filled with 10 gallons of deionized water. To this was added 1.25 v/v % of Chemkleen 2010LP (an alkaline cleaner available from PPG Industries, Inc.) and 0.125% v/v of Chemkleen 181ALP (a phosphate-free blended surfactant additive available from PPG Industries, Inc.) and the resulting alkaline cleaner composition was utilized according to manufacturer instructions. Alkaline cleaner I was used for Examples 1, 2, 3, 5, 6, 7, and 8.

Preparation of Cleaner Composition Bath II (C-II): A bath was filled with 5 gallons of deionized water. To this was added 0.75% w/w concentration of CK490MX (an alkaline cleaner commercially available from PPG Industries, Inc.) and the resulting alkaline cleaner composition was utilized according to manufacturer instructions. Alkaline cleaner II was used for Examples 1, 3, 4.

Preparation of Cleaner Composition Bath III (C-III): A bath was filled with 5 gallons of deionized water. To this was added 5% v/v concentration of Ultrax 45AC Cleaner (an acidic cleaner commercially available from PPG Industries, Inc.) and was utilized according to manufacturer instructions. Alkaline cleaner III was used for Example 3.

Each of the baths containing a Deoxidizing Composition was built by the addition of the metal-containing species listed in Table 2 below as described in more detail below and using the following: fluorozirconic acid (45 wt. % in water) available from Honeywell International, Inc. (Morristown, NJ); fluorosilicic acid (25 wt. % in water) available from Thermofisher Acros Organics (Geel, Belgium); fluorotitanic acid (60 wt. % in water) available from Sigma-Aldrich (St. Louis, MO); 2 wt. % Cu solution, prepared by dilution of a copper nitrate solution (18 wt. % Cu in water) available from Shepherd Chemical Company (Cincinnati, OH); odium molybdate dihydrate available from Thermofisher Acros Organics; lithium nitrate available from Thermofisher Acros Organics; potassium bifluoride (99%) available from Thermofisher Acros Organics.

After all of the ingredients were added to a deoxidizing bath, pH was measured using a pH meter (DualStar pH/ISE Dual Channel Benchtop Meter interface, available from ThermoFisher Scientific, Waltham, MA; pH probe, Fisher Scientific Accumet pH probe (Ag/AgCl reference electrode) by immersing the pH probe in the pretreatment solution. Free fluoride was measured using a DualStar pH/ISE Dual Channel Benchtop Meter (ThermoFisher Scientific) equipped with a fluoride selective electrode (Orion ISE Fluoride Electrode, solid state, available from ThermoFisher Scientific) by immersing the ISE in the pretreatment solution and allowing the measurement to equilibrate. Then, the pH was adjusted as needed with Chemfil buffer (an alkaline buffering solution, commercially available from PPG Industries, Inc.) or fluorozirconic acid (45 wt. % in water, available from Honeywell International, Inc., Morristown, NJ). The free fluoride was adjusted as needed with Chemfos AFL (a partially neutralized aqueous ammonium bifluoride solution, commercially available from PPG Industries, Inc. and prepared according to supplier instructions). The amount of copper in each bath was measured using a DR/890 Colorimeter (available from HACH, Loveland, CO) using an indicator (CuVerl Copper Reagent Powder Pillows, available from HACH).

Preparation of Deoxidizer Composition Bath A (D-A): To a clean 5-gallon plastic bucket was added 19.1 liters of deionized water along with 180.5 g fluorosilicic acid, 11.61 g potassium bifluoride, and 31.6 g of Chemfil Buffer. The deoxidizer was used in Examples 1-7.

Preparation of Deoxidizer Composition Bath B (D-B): To a clean 5-gallon plastic bucket was added 19.1 liters of deionized water along with 180.5 g fluorosilicic acid, 76.4 g fluorozirconic acid, 11.61 g potassium bifluoride, and 31.6 g of Chemfil Buffer. The deoxidizer was used in Examples 1-8.

Preparation of Deoxidizer Composition Bath C (D-C): To a clean 5-gallon plastic bucket was added 19.1 liters of deionized water along with 180.8 g fluorosilicic acid, 19.0 g fluorozirconic acid, 11.65 g potassium bifluoride, and 31.9 g of Chemfil Buffer. The deoxidizer was only used in Example 5.

Preparation of Deoxidizer Composition Bath D (D-D): To a clean 5-gallon plastic bucket was added 19.1 liters of deionized water along with 180.2 g fluorosilicic acid, 305.9 g fluorozirconic acid, 11.63 g potassium bifluoride, and 32.0 g of Chemfil Buffer. The deoxidizer was only used in Example 5.

Preparation of Deoxidizer Composition Bath E (D-E): To a clean 5-gallon plastic bucket was added 19.1 liters of deionized water along with 180.4 g fluorosilicic acid, 35.0 g copper solution, 11.60 g potassium bifluoride, and 31.4 g of Chemfil Buffer. The deoxidizer was only used in Example 5.

Preparation of Deoxidizer Composition Bath F (D-F): To a clean 5-gallon plastic bucket was added 19.1 liters of deionized water along with 180.4 g fluorosilicic acid, 75.8 g fluorozirconic acid, 35.0 g copper solution, 11.60 g potassium bifluoride, and 31.4 g of Chemfil Buffer. The deoxidizer was only used in Example 5.

Preparation of Deoxidizer Composition Bath G (D-G): To a clean 5-gallon plastic bucket was added 19.1 liters of deionized water along with 86.7 g fluorotitanic acid, 11.58 g potassium bifluoride, and 31.1 g of Chemfil Buffer. The deoxidizer was only used in Example 5.

Preparation of Deoxidizer Composition Bath H (D-H): To a clean 5-gallon plastic bucket was added 19.1 liters of deionized water along with 180.6 g fluorosilicic acid, 87.1 g fluorotitanic acid, 11.65 g potassium bifluoride, and 31.7 g of Chemfil Buffer. The deoxidizer was only used in Example 5.

Preparation of Deoxidizer Composition Bath I (D-I): To a clean 5-gallon plastic bucket was added 19.1 liters of deionized water along with 180.4 g fluorosilicic acid, 75.8 g fluorozirconic acid, 4.05 g sodium molybdate, 0.93 g lithium nitrate, 11.60 g potassium bifluoride, and 31.4 g of Chemfil Buffer. The deoxidizer was only used in Example 5.

Preparation of Deoxidizer Composition Bath J (comparative) (D-J): A 3-gallon bath containing AMC66AW Deoxidizer was prepared with 2% v/v concentration of AMC66 (an acidic deoxidizer free of nitric acid available from PPG) and was utilized according to manufacturer instructions. The deoxidizer was only used in Example 8.

Preparation of Deoxidizer Composition Bath K (D-K): To a clean 1-gallon plastic bucket was added 4.0 liters of deionized water along with 36.2 g fluorosilicic acid, 16.0 g fluorozirconic acid, 8.0 g MK-CP-30 (commercially available from Merck GmbH), 2.3 g potassium bifluoride, and 6.4 g of Chemfil Buffer. The pH was 1.9.

nitrite and additional ChemFos 700B according to the product data sheet. The pretreatment was used in Examples 1, 2, and 4.

Preparation of Comparative Pretreatment Composition Bath III (CP-III): A 5-gallon bath containing 200 ppm zirconium and 35 ppm copper was prepared and was adjusted to pH 4.60 and 90 ppm free fluoride. The deoxidizer was only used in Examples 1, 2, 4, 6.

Preparation of Comparative Pretreatment Composition Bath IV (CP-IV): A 5-gallon bath containing 5 v/v % X-Bond2800AE (thin film zirconium-containing pretreatment composition commercially available from PPG) was prepared and utilized according to manufacturer instructions. The pretreatment was only used in Example 3.

Preparation of Comparative Surface Preparation I (SP-I): Substrate was wiped with methyl ethyl ketone. The surface preparation was used in Examples 1, 2, 3, 4, and 7.

Preparation of Comparative Surface Preparation II (SP-II): Substrate was only subjected to cleaner using indicated cleaning method. The surface preparation was used in Examples 1, 2, 3, 4, and 7.

Preparation of Adhesive Composition A (AC-A): Loctite EA E-60HP (an epoxy-containing adhesive composition commercially available from Henkel Corporation) mixed as described by manufacturer. The adhesive was used in only in Example 1.

Preparation of Adhesive Composition B (AC-B): 75.0 g Kane Ace MX-135 (commercially available from Kaneka) were mixed with 7.5 g Dyhard 100S (commercially available from AlzChem) using a SpeedMixer™ (commercially available from FlackTek Inc.). The adhesive was used in only in Examples 2-8.

TABLE 2

Deoxidizer Compositions

| Deoxidizer Composition | Code | Si (ppm) | Zr (ppm) | Ti (ppm) | Mo (ppm) | Li (ppm) | Cu (ppm) | pH | Free Fluoride (ppm)* | Polymer (ppm) |
|---|---|---|---|---|---|---|---|---|---|---|
| Bath A | D-A | 800 | 0 | 0 | 0 | 0 | 0 | 2.25 | 19 | 0 |
| Bath B | D-B | 800 | 800 | 0 | 0 | 0 | 0 | 1.99 | 12 | 0 |
| Bath C | D-C | 800 | 200 | 0 | 0 | 0 | 0 | 2.18 | 17 | 0 |
| Bath D | D-D | 800 | 3200 | 0 | 0 | 0 | 0 | 1.60 | 11 | 0 |
| Bath E | D-E | 800 | 0 | 0 | 0 | 0 | 35 | 2.07 | 12 | 0 |
| Bath F | D-F | 800 | 800 | 0 | 0 | 0 | 35 | 1.86 | 11 | 0 |
| Bath G | D-G | 0 | 0 | 800 | 0 | 0 | 0 | 2.91 | 33 | 0 |
| Bath H | D-H | 800 | 0 | 800 | 0 | 0 | 0 | 1.85 | 14 | 0 |
| Bath I | D-I | 800 | 800 | 0 | 80 | 5 | 0 | 1.96 | 22 | 0 |
| Bath K | D-K | 840 | 800 | 0 | 0 | 0 | 0 | 1.90 | 20 | 240 |

*measured, except for Baths C and K, which were calculated

Preparation of Comparative Pretreatment Composition Bath I (CP-I): A 5-gallon bath containing 142 grams Alodine 1200S (a chrome-containing pretreatment composition commercially available from Henkel Corporation) was prepared and utilized according to manufacturer instructions. The pretreatment was used in Examples 1, 2, and 4.

Preparation of Comparative Pretreatment Composition Bath II (CP-II): A ChemFos700AL (CF700AL, tricationic phosphate pretreatment commercially available from PPG) zinc phosphate pretreatment bath was produced according to manufacturer's instructions by filling a 5 gallon bucket approximately three-fourths full with deionized water. To this was added 700 ml of ChemFos 700A, 1.5 ml ChemFos FE, 51 ml ChemFos AFL, and 350 ml ChemFos 700B (all commercially available from PPG Industries, Inc.). The bath was adjusted to manufacturer specifications with sodium Preparation of Seal Composition Bath A (S-A): To 1.9 L deionized water, 3.85 g MK-CP-30 (commercially available from Merck GmbH) was added. The seal composition was only used in Examples 7 and 8.

Preparation of Seal Composition Bath B (S-B): To 1.9 L deionized water, 4.0 g PVPS-30 (commercially available from Merck GmbH) was added. The seal composition was only used in Example 7.

Preparation of Seal Composition Bath C (S-C): To 13 L deionized water, 6.5 g MK-CP-30 (commercially available from Merck GmbH) was added. The pH was 3.6. The seal was only used in Example 9.

Preparation of Seal Composition Bath D (S-D): To 13 L deionized water, 26 g MK-CP-30 (commercially available from Merck GmbH) was added. The pH was 3.13. The seal was only used in Example 9.

Preparation of Seal Composition Bath E (S-E): To 13 L deionized water, 26 g MK-CP-30 (commercially available from Merck GmbH), and 7.2 g Chemfil buffer was added. The pH was 5.3. The seal was only used in Example 9.

Preparation of Seal Composition Bath F (S-F): To 13 L deionized water, 45.5 g MK-CP-30 (commercially available from Merck GmbH) was added. The pH was 2.90. The seal was only used in Example 9.

Preparation of Seal Composition Bath G (S-G): To 13 L deionized water, 26 g Addibond 275 (commercially available from Solvay) was added. The pH was 2.33. The seal was only used in Example 9.

Preparation of Wax Composition (WX): To 0.24 L heptane, 10 wt. % Quaker DryCoat® 290 wax was added. The wax composition was only used in Example 8.

Preparation of Adhesive Lap Joints: In all examples, adhesive lap shear specimens were prepared according to ASTM D1002-10. The substrate used is specified in each exampled along with the substrate treatment prior to adhesive bonding. The substrates measured 1"×4" and the thickness is specified in each example. The adhesive composition specified in each example was applied to one end of a panel covering the full 1" width and ≥0.5" from one end. Glass beads averaging 0.01" in diameter were mixed into the composition in an amount of 2% by weight based on total weight of the composition. A second substrate treated in the same fashion as the first was then placed over the composition layer in an end-to-end fashion, resulting in a bond area of 1" by the overlap length specified in each example. Lap joints were secured with metal clips and excess composition cleaned, leaving a 45° fillet. Lap joints prepared with AC-A were allowed to cure under ambient conditions for 24 hours before testing. Lap joints prepared with AC-B were cured at 90° C. for 60 minutes, then the temperature was ramped to 160° C. at 1° C. per minute, and finally held at 160° C. for 90 minutes. Cured lap joint specimens were tested using an INSTRON model 5567 in tensile mode under the test conditions specified in each example.

Example 1

Adhesion and Corrosion Performance on Aluminum Alloy Panels Treated with Deoxidizer Composition Aluminum alloy substrate AA6111 purchased from ACT Test Panel Technologies (Hillsdale, MI) Panels (0.047" thick, T4 temper, product code—60560, cut only) were cut from 4" by 12" to 4" by 6" or 4" by 1" using a panel cutter prior to application of the cleaner.

Panels were cleaned with Cleaning Method I outlined in Table 3. For panels treated according to Cleaning Method I, panels were spray cleaned and degreased for 120 seconds at 10-15 psi in the alkaline cleaner (125° F.) using Vee-jet nozzles and rinsed with deionized water by immersing in a deionized water bath (75° F.) for 30 seconds followed by a deionized water spray rinse using a Melnor Rear-Trigger 7-Pattern nozzle set to shower mode (available from Home Depot). Panels were treated with Cleaner I using Composition Cleaning Method I in Example 1.

TABLE 3

| Cleaning Method I | |
|---|---|
| Step 1-I | Alkaline cleaner (120 seconds, 120° F., spray application) |
| Step 2-I | Deionized water rinse (30 seconds, 75° F., immersion application) |
| Step 3-I | Deionized water rinse (30 seconds, 75° F., spray application) |

TABLE 4

| Cleaning Method II | |
|---|---|
| Step 1-II | Alkaline cleaner (120 seconds, 100° F., immersion application) |
| Step 2-II | Deionized water rinse (30 seconds, 75° F., immersion application) |
| Step 3-II | Deionized water rinse (30 seconds, 75° F., spray application) |

Panels were further treated using either Treatment Method A, B, or C outlined in Tables 5-7 below. For Treatment Method A (TM-A), all panels were immersed in either CP-I or CP-III for 120 seconds (80° F.), rinsed by a deionized water spray rinse using the using a Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting.

For panels treated according to Treatment Method B, panels were immersed in rinse conditioner for 60 seconds (75° F.), followed by CP-II for 120 seconds (125° F.). Panels were subsequently spray rinsed with deionized water using the Melnor Rear-Trigger 7-Pattern nozzle set to shower mode (75° F.) for 30 seconds and then were dried with hot air (140° F.) for 120 seconds using a Hi-Velocity handheld blow-dryer made by Oster® (model number 078302-300-000) on high-setting.

For panels treated according to Treatment Method C, panels were immersed in deoxidizer D-A or D-B for 60 seconds (90° F.), followed by spray rinse with deionized water using the Melnor Rear-Trigger 7-Pattern nozzle set to shower mode (75° F.) for 30 seconds and then were dried with hot air (140° F.) for 120 seconds using a Hi-Velocity handheld blow-dryer made by Oster® (model number 078302-300-000) on high-setting.

TABLE 5

| Treatment Method A | |
|---|---|
| Step 4A | Pretreatment (120 seconds, 80° F., immersion application) |
| Step 5A | Deionized water rinse (30 seconds, 75° F., spray application) |
| Step 6A | Hot Air Dry (120 seconds, 140° F.) |

TABLE 6

| Treatment Method B | |
|---|---|
| Step 4B | Rinse Conditioner (60 seconds, 75° F., immersion application) |
| Step 5B | Tricationic Phosphate Pretreatment (120 seconds, 125° F., immersion application) |
| Step 6B | Deionized water rinse (30 seconds, 75° F., spray application) |
| Step 7B | Hot Air Dry (120 seconds, 140° F.) |

TABLE 7

| Treatment Method C | |
|---|---|
| Step 4C | Deoxidizer (60 seconds, 90° F., immersion application) |
| Step 5C | Deionized water rinse (30 seconds, 75° F., spray application) |
| Step 6C | Hot Air Dry (120 seconds, 140° F.) |

Following completion of Treatment Methods A, B, or C, all 4" by 6" AA6111 panels were electrocoated with ED7000Z (a cathodic electrocoat with components commercially available from PPG), according to manufacturer instructions using a DC power supplied rectifier (Xantrax Model XFR600-2, Elkhart, Indiana, or Sorensen XG 300-5.6, Ameteck, Berwyn, PA). The film thickness was controlled to deposit a target film thickness of 0.65±0.2 mils. Following deposition of the electrocoat, panels were baked in an oven (Despatch Model LFD-1-42) at 177° C. for 25 minutes. Electrocoated panels were scribed with a 4" vertical line in the middle of the panel down to the metal substrate and were exposed to G-85 A2 cyclic corrosion testing for 21 days. The average scribe creep of two panels is shown in Table 8 below. Scribe creep refers to the area of paint loss around the scribe either through corrosion or disbondment (e.g., affected paint to scribe).

All 4" by 1" panels were used to prepare adhesive lap joint specimens as described above with Adhesive Composition A. The lap joint overlap length was 0.5" and the adhesive was cured under ambient conditions for 24 hours before testing. Adhesive lap joints were tested with 5.5" gap setting and at a pull rate of 0.05" per minute. The average lap shear strength and displacement of five repetitions are shown in Table 8 below.

TABLE 8

AA6111 Lap Shear Properties with Adhesive Composition A and Corrosion Results after 21 days in G-85 A2 Cyclic Corrosion Testing

| Substrate | Cleaner | Cleaner Method | Surface Treatment | Surface Treatment Method | Lap Shear (MPa) | Displacement (mm) | Scribe Creep (mm) |
|---|---|---|---|---|---|---|---|
| AA6111 | N/A | N/A | SP-1 | N/A | 12 | 0.5 | 17.4 |
| AA6111 | C-I | CM-I | SP-II | N/A | 22 | 7.0 | 9.2 |
| AA6111 | C-I | CM-I | CP-I | TM-A | 10 | 0.5 | 1.0 |
| AA6111 | C-I | CM-I | CP-II | TM-B | 21 | 5.5 | 6.7 |
| AA6111 | C-I | CM-I | CP-III | TM-A | 14 | 1.0 | 2.8 |
| AA6111 | C-I | CM-I | D-A | TM-C | 23 | 8.0 | 2.9 |
| AA6111 | C-I | CM-I | D-B | TM-C | 23 | 9.5 | 2.1 |

These data demonstrate that application of the deoxidizer composition disclosed herein allows good adhesion performance without sacrificing corrosion resistance on aluminum alloys.

Example 2

Aluminum Alloy Adhesion Performance with Varied Surface Preparations

Aluminum Alloy Substrate AA6111 was Purchased from ACT Test Panel Technologies (Hillsdale, MI). ACT AA6111 (0.047" thick, T4 temper, product code—60560, cut only) were cut from 4" by 12" to 4" by 1" using a panel cutter prior to the cleaner application. Panels were cleaned with Cleaner I using Cleaning Method I outlined in Table 3. Panels were further treated using either Treatment Method A, B, or C outlined in Tables 5-7.

All AA6111 were used to prepare lap joint specimens with Adhesive Composition B as described above. Adhesive lap joints had a 0.51" overlap length and were cured using the bake cycle described above. Adhesive lap joints were tested with a 4" gap setting and at a pull rate of 0.51" per minute. The average lap shear strength and displacement of five repetitions are shown in Table 9 below.

TABLE 9

Lap Shear Properties of AA6111 with Adhesive Composition B

| Substrate | Cleaner | Cleaner Method | Surface Treatment | Surface Treatment Method | Adhesive Composition | Lap Shear (MPa) | Displacement (mm) |
|---|---|---|---|---|---|---|---|
| AA6111 | N/A | N/A | SP-1 | N/A | AC-B | 31.23 | 11.9 |
| AA6111 | C-I | CM-I | SP-II | N/A | AC-B | 32.72 | 16.67 |
| AA6111 | C-I | CM-I | CP-I | TM-A | AC-B | 31.71 | 12.79 |
| AA6111 | C-I | CM-I | CP-II | TM-B | AC-B | 28.18 | 6.74 |
| AA6111 | C-I | CM-I | CP-III | TM-A | AC-B | 32.05 | 14.89 |
| AA6111 | C-I | CM-I | D-A | TM-C | AC-B | 35.56 | 13.85 |
| AA6111 | C-I | CM-I | D-B | TM-C | AC-B | 31.93 | 12.94 |

These data demonstrate that application of the deoxidizer composition disclosed herein improved adhesion on aluminum alloys without sacrificing corrosion resistance.

Example 3

Aluminum Alloy Adhesion and Corrosion Performance with Acidic Cleaners

Aluminum alloy substrate AA2024 was purchased from Online Metals (0.063" thick, T3 temper, bare). Panels were cut from 4" by 12" to 4" by 3" or 4" by 1" using a panel cutter prior to application of the cleaner.

Panels were cleaned with Cleaner II or Cleaner III and were treated according to Cleaning Method II outlined in Table 4. For panels treated according to Cleaning Method II, panels were immersion cleaned and degreased for 120 seconds in the alkaline cleaner (100° F.) under high agitation. Panels were rinsed with deionized water by immersing in a deionized water bath (75° F.) for 30 seconds followed by a deionized water spray rinse using a Melnor Rear-Trigger 7-Pattern nozzle set to shower mode (available from Home Depot). All AA2024 substrate was treated with Cleaner II using Cleaning Method II in Example 1.

Panels were further treated using either Treatment Method A or C outlined in Tables 5 and 7 as described previously.

All 4" by 3" AA2024 panels were spray coated with E90H226/V93V227 (a 2K Epoxy Primer with components commercially available from Sherwin Williams), to deposit a target film thickness of 1.5±0.2 mils. Panels were allowed to cure under ambient conditions for 7 d. Coated panels were scribed with a 2.5" vertical line in the middle of the panel down to the metal substrate with a width of 1.29 mm and were exposed to B117 salt spray corrosion testing for 500 hours. The average scribe creep of two panels is shown in Table 10 below. Scribe creep refers to the area of paint loss around the scribe either through corrosion or disbondment (e.g., affected paint to scribe).

All 4" by 1" AA2024 panels used to prepare lap joint specimens with Adhesive Composition B as described above. Adhesive lap joints had an overlap length of 0.5" and were cured using the bake cycle described above. Adhesive lap joints were tested with 5.5" gap setting and at a pull rate of 0.05" per minute. The average lap shear strength and displacement of five repetitions are shown in Table 10 below.

TABLE 10

AA2024 Lap Shear Properties with Adhesive Composition B and Corrosion Results in B117 Salt Spray (500 h)

| Substrate | Cleaner | Cleaner Method | Surface Treatment | Surface Treatment Method | Lap Shear (MPa) | Displacement (mm) | Scribe Creep (mm) |
|---|---|---|---|---|---|---|---|
| AA2024 | N/A | N/A | SP-I | N/A | 35.88 | 2.61 | 9.47 |
| AA2024 | C-II | CM-II | SP-II | N/A | 41.90 | 3.27 | 5.39 |
| AA2024 | C-III | CM-II | SP-II | N/A | 41.97 | 3.69 | 3.35 |
| AA2024 | C-III | CM-II | CP-IV | TM-A | 42.17 | 3.36 | 4.39 |
| AA2024 | C-III | CM-II | D-A | TM-C | 43.28 | 3.93 | 5.08 |
| AA2024 | C-III | CM-II | D-B | TM-C | 43.35 | 4.28 | 0.99 |

These data demonstrate that application of the deoxidizer composition disclosed herein improved adhesion without sacrificing corrosion resistance on aluminum alloys.

Example 4

Aluminum Alloy Adhesion Performance Under Constant Stress and Humid Environment Aluminum alloy substrate AA6022 purchased from ACT Test Panel Technologies (Hillsdale, MI). AA6022 panels (6"×6"×0.125") were cleaned with Cleaner II using Cleaning Method II outlined in Table 4. Panels were further treated using either Treatment Method A, B, or C outlined in Tables 5-7.

Treated AA6022 panels were used to prepare adhesive bond specimens for the wedge cleavage test according to ASTM D3762-03. One end of each AA6022 panel was covered with 0.75" wide Teflon tape before being bonded with Adhesive Composition B. Adhesive was cured according to the bake cycle given above. Five 1"×6" test specimens were cut from the 6"×6" bonded panels by Alle-Kiski Industries. A stainless-steel wedge (1"×1", 0.25" tip) was driven into each test specimen at the bond end covered by Teflon tape. After 24 hours the initial position of the crack tip within the adhesive was marked under 10× magnification. Specimens were then placed into a chamber at 60° C. and 100% relative humidity. The average crack propagation length after 35 days is given in Table 11 below.

TABLE 11

Crack Propagation in Wedge Cleavage Test of AA6022 Adhesively Bonded with Composition B after 35 Days at 60° C. and 100% Relative Humidity

| Substrate | Cleaner | Cleaner Method | Surface Treatment | Surface Treatment Method | Crack Propagation (mm) |
|---|---|---|---|---|---|
| AA6022 | N/A | N/A | SP-1 | N/A | >110* |
| AA6022 | C-II | CM-II | SP-II | N/A | 20.6 |
| AA6022 | C-II | CM-II | CP-I | TM-A | 37.8 |
| AA6022 | C-II | CM-II | CP-II | TM-B | 69.8 |
| AA6022 | C-II | CM-II | CP-III | TM-A | 7.9 |
| AA6022 | C-II | CM-II | D-A | TM-C | 42.1 |
| AA6022 | C-II | CM-II | D-B | TM-C | 3.0 |

*Condition had complete crack propagation (complete failure) after 1 day.

These data demonstrate that application of the deoxidizer composition disclosed herein improved adhesion under stress and humidity exposure on aluminum alloys over other surface treatments and comparative pretreatments.

Example 5

Aluminum Alloy Adhesion Performance with Varied Deoxidizer Compositions

Aluminum alloy substrate AA6111 was purchased from ACT Test Panel Technologies (Hillsdale, MI). ACT AA6111 panels (0.047" thick, T4 temper, product code—60560, cut only) were cut from 4" by 12" to 4" by 1" using a panel cutter prior to the cleaner application.

Panels were cleaned with Cleaner I using Cleaning Method I outlined in Table 3. Panels were further treated using Treatment Method C outlined in Table 7.

All AA6111 were used to prepare lap joint specimens with Adhesive Composition B as described above. Adhesive lap joints had an overlap length of 0.51" and were cured using the bake cycle described above. Adhesive lap joints were tested with a 4" gap setting and at a pull rate of 0.51" per minute. The average lap shear strength and displacement of five repetitions are shown in Table 12 below.

TABLE 12

Lap Shear Properties of AA6111 with Adhesive Composition B with Varied Surface Treatments

| Substrate | Cleaner | Cleaner Method | Surface Treatment | Surface Treatment Method | Lap Shear (MPa) | Displacement (mm) |
|---|---|---|---|---|---|---|
| AA6111 | C-I | CM-I | D-A | TM-C | 35.56 | 13.85 |
| AA6111 | C-I | CM-I | D-B | TM-C | 31.93 | 12.94 |
| AA6111 | C-I | CM-I | D-C | TM-C | 31.74 | 10.83 |
| AA6111 | C-I | CM-I | D-D | TM-C | 31.05 | 15.16 |
| AA6111 | C-I | CM-I | D-E | TM-C | 31.93 | 15.72 |

TABLE 12-continued

Lap Shear Properties of AA6111 with Adhesive Composition B with Varied Surface Treatments

| Substrate | Cleaner | Cleaner Method | Surface Treatment | Surface Treatment Method | Lap Shear (MPa) | Displacement (mm) |
|---|---|---|---|---|---|---|
| AA6111 | C-I | CM-I | D-F | TM-C | 32.49 | 19.28 |
| AA6111 | C-I | CM-I | D-G | TM-C | 32.53 | 15.50 |
| AA6111 | C-I | CM-I | D-H | TM-C | 32.16 | 16.23 |
| AA6111 | C-I | CM-I | D-I | TM-C | 32.62 | 18.29 |

These data demonstrate that application of a variety of deoxidizer compositions within the a variety of ranges improved adhesion on aluminum alloys.

Example 6

Hot Dipped Galvanized Adhesion and Corrosion Performance

Substrate was obtained from Chemetall. Hot dip galvanized steel panels (Gardobond MBZ1/EA, 105 mm×190 mm×0.75 mm, oiled, without treatment) were either cut in half yielding 2.07" by 3.74" panels or cut into 1" by 3.74" coupons prior to application of the alkaline cleaner.

Panels were cleaned with Cleaner I using Cleaning Method I outlined in Table 3. Panels were further treated using either Treatment Method A, C, or D outlined in Tables 5, 7, or 13.

For Treatment Method D, all panels were immersed in deoxidizer composition D-A for 60 seconds (90° F.), rinsed by a deionized water spray rinse using the using a Melnor Rear-Trigger 7-Pattern nozzle set to shower mode (75° F.) for 30 seconds, immersed in pretreatment CP-III for 120 seconds (80° F.), rinsed by a deionized water spray rinse using the using a Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting.

TABLE 13

| Treatment Method D | |
|---|---|
| Step 4D | Deoxidizer (60 seconds, 90° F., immersion application) |
| Step 5D | Deionized water rinse (30 seconds, 75° F., spray application) |
| Step 6D | Pretreatment (120 seconds, 80° F., immersion application) |
| Step 7D | Deionized water rinse (30 seconds, 75° F., spray application) |
| Step 8D | Hot Air Dry (120 seconds, 140° F.) |

Following completion of Treatment Methods A, C, or D, all 4" by 6" AA6111 panels were electrocoated with ED7000Z (a cathodic electrocoat with components commercially available from PPG), according to manufacturer instructions using a DC power supplied rectifier (Xantrax Model XFR600-2, Elkhart, IN, or Sorensen XG 300-5.6, Ameteck, Berwyn, PA). The film thickness was controlled to deposit a target film thickness of 0.65±0.2 mils. Following deposition of the electrocoat, panels were baked in an oven (Despatch Model LFD-1-42) at 177° C. for 25 minutes. Electrocoated panels were scribed with a 4" vertical line in the middle of the panel down to the metal substrate and were exposed to GMW14872 cyclic corrosion testing for 40 cycles. The average scribe creep of two panels is shown in Table 14 below. Scribe creep refers to the area of paint loss around the scribe either through corrosion or disbondment (e.g., affected paint to affected paint).

All 3.74" by 1" HDG were used to prepare lap joint specimens with Adhesive Composition B as described above. Adhesive lap joints had an overlap length of 0.51" and were cured using the bake cycle described above. Adhesive lap joints were tested with a 4" gap setting and at a pull rate of 0.51" per minute. The average lap shear strength and displacement of three repetitions are shown in Table 14 below.

TABLE 14

HDG Lap Shear Properties with Adhesive Composition B and Corrosion Results after 40 Cycles in GMW14872 Cyclic Corrosion Testing

| Substrate | Cleaner | Cleaner Method | Surface Treatment | Surface Treatment Method | Lap Shear (MPa) | Displacement (mm) | Scribe Creep (mm) |
|---|---|---|---|---|---|---|---|
| HDG | C-I | CM-I | CP-III | TM-A | 11.5 | 3.4 | 7.59 |
| HDG | C-I | CM-I | D-A | TM-C | 16.3 | 40.8 | 8.34 |
| HDG | C-I | CM-I | D-B | TM-C | 16.4 | 35.0 | 7.75 |
| HDG | C-I | CM-I | D-B, CP-III | TM-D | 11.8 | 4.2 | 6.34 |

These data demonstrate that application of the deoxidizer compositions disclosed herein improved adhesion on galvanized substrate. Adhesion was comparable for Comparative Pretreatment III and Deoxidizer B followed by Comparative Pretreatment III, indicating that Deoxidizer B only provided unexpected performance which was lost when combined with standard pretreatment.

Example 7

Aluminum Alloy Adhesion Performance with Deoxidizer Compositions Followed by Polymeric Pretreatment Aluminum alloy substrate AA5754 was purchased from ACT Test Panel Technologies (Hillsdale, MI). ACT AA5754 panels (0.063" thick) were cut to 4" by 1" using a panel cutter prior to the cleaner application.

Panels were cleaned with Cleaner I using Cleaning Method I outlined in Table 3. Panels were further treated using Treatment Method G or H outlined in Tables 15 and 16.

For Treatment Method G, panels were immersed in deoxidizer D-B or D-J for 60 seconds (90° F.), followed by spray rinse with deionized water using the Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting. Substrate was further coated with a thin layer of Quaker DryCoat® 290 wax (approximately 3 g/m2) by dip coating into Sealing Composition and was allowed to evaporate at least 30 minutes prior to adhesive bonding.

For Treatment Method H, panels were immersed in deoxidizer D-B or D-J for 60 seconds (90° F.), followed by spray rinse with deionized water using the Melnor Rear-Trigger 7-Pattern nozzle set to shower mode (75° F.) for 30 seconds, followed by immersion in S-A or S-B for 120 seconds (75° F.), rinsed by a deionized water spray rinse using the using a Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting. Substrate was further coated with a thin layer of Quaker DryCoat® 290 wax (approximately 3 g/m2) by dip coating into WX Composition and was allowed to evaporate at least 30 minutes prior to adhesive bonding.

TABLE 15

| Treatment Method G | |
|---|---|
| Step 4G | Deoxidizer (60 seconds, 90° F., immersion application) |
| Step 5G | Deionized water rinse (30 seconds, 75° F., spray application) |
| Step 8G | Hot Air Dry (120 seconds, 140° F.) |
| Step 9G | WX Composition (10 seconds, 75° F., immersion application) |
| Step 10G | Ambient Dry (30 minutes, 75° F.) |

TABLE 16

| Treatment Method H | |
|---|---|
| Step 4G | Deoxidizer (60 seconds, 90° F., immersion application) |
| Step 5G | Deionized water rinse (30 seconds, 75° F., spray application) |
| Step 6G | Seal (120 seconds, 75° F., immersion application) |
| Step 7G | Deionized water rinse (30 seconds, 75° F., spray application) |
| Step 8G | Hot Air Dry (120 seconds, 140° F.) |
| Step 9G | WX Composition (10 seconds, 75° F., immersion application) |
| Step 10G | Ambient Dry (30 minutes, 75° F.) |

All AA5754 substrates were used to prepare lap joint specimens with Adhesive Composition B as described above. Adhesive lap joints had an overlap length of 0.51" and were cured using the bake cycle described above. Adhesive lap joints were tested with a 4" gap setting and at a pull rate of 0.51" per minute. The average lap shear strength and displacement of three repetitions are shown in Table 17 below.

A duplicate set of samples was prepared but was exposed to ASTM-B 368-09 Copper Acetic Acid Salt Spray, for 6 d prior to adhesion testing. The average lap shear strength of the aged samples for three repetitions are shown in Table 17 below.

TABLE 17

Lap Shear Properties of AA5754 with Adhesive Composition B with Varied Surface Treatments

| Substrate | Cleaner | Cleaner Method | Surface Treatment | Surface Treatment Method | Lap Shear (MPa) | Lap Shear Strength Post-Corrosion Testing (MPa) |
|---|---|---|---|---|---|---|
| AA5754 | C-I | CM-I | D-B | TM-G | 26.6 | 21.6 |
| AA5754 | C-I | CM-I | D-B, S-A | TM-H | 30.6 | 28.5 |
| AA5754 | C-I | CM-I | D-J | TM-G | 28.3 | 25.6 |
| AA5754 | C-I | CM-I | D-J, S-A | TM-H | 34.1 | 30.3 |
| AA5754 | C-I | CM-I | D-J, S-B | TM-H | 27.8 | 27.7 |

These data demonstrate that application of the deoxidizer compositions disclosed herein can improve the adhesion after corrosion environments when substrate is treated with a seal composition.

Example 8

Aluminum Alloy Adhesion Performance with Deoxidizer Compositions with Polymeric Component Aluminum alloy substrate AA6111 was purchased from ACT Test Panel Technologies (Hillsdale, MI). ACT AA6111 panels (0.047" thick, T4 temper, product code-60560, cut only) were cut to 4" by 1" or 4" by 6" using a panel cutter prior to the cleaner application.

Panels were cleaned with Cleaner I using Cleaning Method I outlined in Table 3. Panels were further treated using Treatment Method G or H outlined in Tables 15 and 16.

For Treatment Method G, panels were immersed in deoxidizer D-B or D-K for 60 seconds (90° F.), followed by spray rinse with deionized water using the Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting. Substrate was further coated with a thin layer of Quaker DryCoat® 290 wax (approximately 3 g/m2) by dip coating into Wax Composition and was allowed to evaporate at least 30 minutes prior to adhesive bonding.

For Treatment Method H, panels were immersed in deoxidizer D-B for 60 seconds (90° F.), followed by spray rinse with deionized water using the Melnor Rear-Trigger 7-Pattern nozzle set to shower mode (75° F.) for 30 seconds, followed by immersion in Seals S-C through S-H for 120 seconds (75° F.), rinsed by a deionized water spray rinse using the using a Melnor Rear-Trigger 7-Pattern nozzle set to shower mode (75° F.) for 30 seconds, and dried with hot air (140° F.) for 120 seconds using a Hi-Velocity handheld blow-dryer made by Oster® (model number 078302-300-000) on high-setting. Substrate was further coated with a thin layer of Quaker DryCoat® 290 wax (approximately 3 g/m2) by dip coating into Wax Composition and was allowed to evaporate at least 30 minutes prior to adhesive bonding.

All AA6111 substrates were used to prepare lap joint specimens with Adhesive Composition B as described above. Adhesive lap joints had an overlap length of 0.51" and were cured using the bake cycle described above. Adhesive lap joints were tested with a 4" gap setting and at a pull rate of 0.51" per minute. The average lap shear strength and displacement of three repetitions are shown in Table 18 below.

A duplicate set of samples was prepared but was exposed to G-85 A2 wet bottom modified testing (40 min. purge, 70% controlled RH for 80 min, followed by 87% controlled humidity for 195 min) for 6 d prior to adhesion testing. The average lap shear strength of the aged samples for three repetitions are shown in Table 18 below.

TABLE 18

Lap Shear Properties of AA6111 with Adhesive Composition B with Varied Surface Treatments

| Substrate | | Cleaner | Cleaner Method | Surface Treatment | Surface Treatment Method | Lap Shear (MPa) | Lap Shear Strength Post-Corrosion Testing (MPa) | Displacement (mm) | Displacement Post-Corrosion Testing (mm) |
|---|---|---|---|---|---|---|---|---|---|
| AA6111 | A | C-I | CM-I | SP-II | N/A | 27.8 | 26.2 | 12.8 | 9.5 |
| AA6111 | B | C-I | CM-I | CP-III | TM-A | 27.6 | 26.6 | 12.5 | 10.9 |
| AA6111 | C | C-I | CM-I | D-B | TM-G | 27.7 | 27.1 | 12.8 | 11.2 |
| AA6111 | F | C-I | CM-I | D-B, SC | TM-H | 28.6 | 27.7 | 15.9 | 13.7 |
| AA6111 | D | C-I | CM-I | D-B, S-D | TM-H | 28.6 | 28.7 | 16.5 | 17.4 |
| AA6111 | E | C-I | CM-I | D-B, S-E | TM-H | 27.9 | 27.4 | 13.9 | 12.5 |
| AA6111 | G | C-I | CM-I | D-B, S-F | TM-H | 28.1 | 28.7 | 15.1 | 18.0 |
| AA6111 | H | C-I | CM-I | D-B, S-G | TM-H | 29.0 | 28.6 | 16.7 | 16.7 |
| AA6111 | J | C-I | CM-I | D-K | TM-G | 28.7 | 28.4 | 16.8 | 15.4 |

These data demonstrate that application of the deoxidizer compositions disclosed herein can improve the adhesion after corrosion environments with an additional seal step. These data also show the combination of the seal into the deoxidizer composition to be effective.

Example 9

Panel (aluminum substrate obtained from Hydro, 4.5% to 5.5% magnesium content) samples 1-10 were prepared using PPG7570 and PPG4730 available from PPG.

Coated panels were obtained by applying the coatings either over Bonderite 802N (available from Henkel) Zirconium pretreated aluminum panels, untreated aluminum panels, or aluminum panels treated with MK-CP-30 (available from Merck), using a wire wound rod to obtain dry coating weights of approximately 7.0 mg/square inch (msi). The coated panels were immediately placed into a one-zone, gas-fired, conveyor oven for 12 seconds and baked to a peak metal temperature of 241° C.

In samples 1-6, aluminum panels were pretreated by immersing in an Ultrax 14 cleaner (available from PPG) for 90 seconds at 52° C., followed by a brief deionized water rinse and then immersion in a 0.5 g/L solution of MK-CP-30 in DI water for 60 seconds at room temperature (22° C.). The control panels were pretreated by immersing in an Ultrax 14 cleaner for 90 seconds at 52° C. Results are summarized in Table 19.

In samples 7-10, aluminum panels were pretreated by immersing in a solution consisting of Ultrax 14 and either 0.5 g/L or 5 g/L of MK-CP-30 for 120 seconds at 52° C. The control panels were pretreated by immersing in an Ultrax cleaner for 120 seconds at 52° C. Results are summarized in Table 20.

The coatings were evaluated for the number of double rubs, using a 900 grams hammer wrapped with 12 ply gauze, that it took to soften and break through the coating with gauze saturated with methyl ethyl ketone.

The flexibility was evaluated with a wedge bend test. The panels for the wedge bend test were made using a BYK- Gardner "Coverall" Bend and Impact Tester. A 5 centimeter by 10 centimeter coated test panel was first bent over the 0.32 centimeter metal dowel along the long length of the panel with the coated side facing out. The bent panel was placed between the parts of the hinge. The impact tool, flat face down, weighed 2.1 kilograms and was dropped from a height of 28 centimeters onto the upper part of the hinge. The impacted test panel had a wedge shape where one end of the coated metal impinged upon itself and a 0.32 centimeter space remained on the opposite end. The wedge bent panels were then placed into an aqueous solution of copper sulfate and hydrochloric acid for 15 seconds to purposely etch the aluminum panel in areas where the coatings cracked and failed. The etched wedge bent panels were then examined through a microscope at 20× power to determine how far from the impinged end along the bent radii did the coating crack. Flex results are reported as the percentage of cracked area versus total length of the wedge bent panel. Generally lower numbers are more desirable. The coatings were also evaluated for their ability to adhere to the aluminum panels and to resist blushing in three aqueous solutions as described below. The results of the tests are reported in Tables 19 and 20.

TABLE 19

Cured Coating Properties for substrate treated in Example 10

| Sample | Paint | Surface Pretreatment | MEK rubs | Wedge Bends (% failure) | Acetic Acid Blush | Acetic Acid Adhesion | Citric Retort Blush | Citric Retort Adhesion | Water Retort Blush | Water Retort Adhesion |
|---|---|---|---|---|---|---|---|---|---|---|
| 1 | PPG-7570 | Clean-only | 10 | 27 | 4 | 4B | 2 | 0B | 8 | 5B |
| 2 | PPG-7570 | MK-CP-30 | 10 | 22 | 7 | 4B | 4 | 3B | 8 | 4B |
| 3 | PPG-7570 | Bonderite 802N | 16 | 14 | 8 | 5B | 6 | 4B | 8 | 5B |
| 4 | PPG-4730 | Clean-only | 50 | 21 | 4 | 4B | 2 | 0B | 7 | 5B |
| 5 | PPG-4730 | MK-CP-30 | 57 | 17 | 6 | 5B | 4 | 3B | 9 | 4B |
| 6 | PPG-4730 | Bonderite 802N | 95 | 6 | 6 | 5B | 7 | 4B | 6 | 5B |

TABLE 20

Cured Coating Properties for substrate treated in Example 10

| Sample | Paint | Surface Pretreatment | MEK rubs | Wedge Bends (% failure) | Acetic Acid Blush | Acetic Acid Adhesion | Citric Retort Blush | Citric Retort Adhesion | Water Retort Blush | Water Retort Adhesion |
|---|---|---|---|---|---|---|---|---|---|---|
| 7 | PPG-4730 | Clean-only | 32 | 17 | 6 | 5B | 4 | 0B | 7 | 5B |
| 8 | PPG-4730 | MK-CP-30 (0.5 g/L) | 52 | 18 | 4 | 5B | 6 | 0B | 7 | 5B |
| 9 | PPG-4730 | MK-CP-30 (5 g/L) | 72 | 16 | 4 | 5B | 4 | 0B | 6 | 5B |
| 10 | PPG-4730 | Bonderite 802N | 76 | 11 | 8 | 5B | 4 | 2B | 7 | 5B |

Blush resistance measures the ability of a coating to resist attack by various testing solutions. When the coated film absorbs test solution, it generally becomes cloudy or looks white. Blush was measured visually using a scale of 1-10 where a rating of "10" indicates no blush and a rating of "0" indicates complete whitening of the film. Blush ratings of at least 7 were desired. The coated panel tested was 2×4 inches (5×10 cm) and the testing solution covered half of the panel being tested to enable comparison of the blush of the exposed panel to the unexposed portion.

Adhesion testing was performed to assess whether the coating adhered to the substrate. The adhesion test was performed according to ASTM D 3359 Test Method B, using Scotch 610 tape, available from 3M Company of Saint Paul, Minn. Adhesion was rated on a scale of 0-5 where a rating of "5" indicates no adhesion failure.

The "Acetic Acid" test measured the resistance of a coating to a boiling 3% acetic acid solution. The solution was prepared by mixing 90 grams of Glacial Acetic Acid (product of Fisher Scientific) into 3000 grams of deionized water. Coated strips were immersed into the boiling Acetic Acid solution for 30 minutes. The strips were then rinsed and cooled in deionized water, dried, and immediately rated for blush and adhesion as described previously.

The "DI Water Retort" test measured the resistance of a coating to deionized water. Coated strips were immersed into the deionized water and placed in a steam retort for 30 minutes at 250° F. (121° C.). The strips were then cooled in deionized water, dried, and immediately rated for blush and adhesion as described previously.

The "Citric Acid Retort" test measured the resistance of a coating to 2% citric acid solution. The solution was prepared by mixing 32 grams of citric acid (product of Spectrum) into 1600 grams of deionized water. Coated strips were immersed into the Citric Acid solution and placed in a steam retort for 30 minutes at 250° F. (121° C.). The strips were then cooled in deionized water, dried, and immediately rated for blush and adhesion as described previously. Treatment of the substrate with the system disclosed herein improved the wedge bends, blush, and adhesion properties versus clean-only panels.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. A system for deoxidizing and coating a substrate, comprising:

a deoxidizing composition comprising a Group IVA metal in an amount of 10 ppm to 1,000 ppm, a Group IVB metal in an amount of 200 ppm to 5,000 ppm, and free fluoride in an amount of 2 ppm to 100 ppm, the deoxidizing composition having a pH of 1.0 to 3.0 and being substantially free of chromium, wherein the amounts are based on total weight of the deoxidizing composition; and an adhesive coating composition comprising: an epoxy-containing component in an amount of 45 percent by weight to 85 percent by weight; a guanidine curing agent in an amount of 0.5 percent by weight to 20 percent by weight; and elastomeric particles in an amount of 11 percent by weight to 40 percent by weight; wherein percent by weight is based on total weight of the adhesive coating composition.

2. The system of claim 1, wherein the deoxidizing composition further comprises a homopolymer or a copolymer comprising a phosphorous-containing monomeric subunit m1.

3. The system of claim 2, wherein the copolymer of the deoxidizing composition further comprises a non-phosphorous-containing monomeric subunit m2.

4. The system of claim 1, wherein:

(a) at least 50% by weight of the elastomeric particles comprise a styrene butadiene core based on total weight of the elastomeric particles; and/or (b) wherein at least 50% by weight of the elastomeric particles based on total weight of the elastomeric particles have an average particle size of less than 150 nm as measured by transmission electron microscopy; and/or (c) wherein no more than 50% by weight of the elastomeric particles comprise a polybutadiene core and/or a polysiloxane core based on total weight of the elastomeric particles.

5. The system of claim 1, wherein the adhesive coating composition further comprises at least one accelerator.

6. The system of claim 5, wherein the at least one accelerator comprises a latent accelerator, an encapsulated accelerator, a non-latent accelerator, a non-encapsulated accelerator, or combinations thereof.

7. The system of claim 1, further comprising a cleaner composition and/or a seal composition.

8. The system of claim 7, wherein the cleaner composition and/or the seal composition comprises a homopolymer or a copolymer comprising a phosphorous-containing monomeric subunit m1.

9. The system of claim 8, wherein the copolymer of the cleaner composition and/or the seal composition further comprises a non-phosphorous-containing monomeric subunit m2.

10. A method of treating a substrate with the system of claim 1, comprising:

contacting at least a portion of a surface of the substrate with the deoxidizing composition; and subsequently contacting at least a portion of a surface of the substrate with the adhesive coating composition.

11. The method of claim 10, wherein the surface is not contacted with a pretreatment composition.

12. The method of claim 10, further comprising:

contacting at least a portion of a surface of the substrate with a cleaner composition; and/or contacting at least a portion of a surface of the substrate with a seal composition.

13. A treated substrate produced by the method of claim 10.

14. The treated substrate of claim 13, wherein the treated substrate is at least partially coated with the adhesive coating composition.

15. The treated substrate of claim 13, wherein the treated substrate is at least partially embedded in the adhesive coating composition.

16. Protective clothing comprising the treated substrate of claim 13.

17. A vehicle comprising the treated substrate of claim 13.

18. A can comprising the treated substrate of claim 13.

19. An article comprising the treated substrate of claim 13, wherein the substrate is comprised of a first material.

20. The article of claim 19, further comprising a second substrate comprised of the first material and/or a second material.

* * * * *